(12) United States Patent
Uelk et al.

(10) Patent No.: US 12,120,533 B2
(45) Date of Patent: *Oct. 15, 2024

(54) MOBILE CELLULAR NETWORKS

(71) Applicant: Oceus Networks, LLC, Reston, VA (US)

(72) Inventors: Joseph L. Uelk, Dallas, TX (US); Chris Hill, Plano, TX (US)

(73) Assignee: Oceus Networks, LLC, Herndon, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/349,860

(22) Filed: Jul. 10, 2023

(65) Prior Publication Data
US 2024/0179537 A1  May 30, 2024

Related U.S. Application Data

(63) Continuation of application No. 17/589,412, filed on Jan. 31, 2022, now Pat. No. 11,743,740, which is a
(Continued)

(51) Int. Cl.
*H04W 16/18* (2009.01)
*H04L 41/042* (2022.01)
(Continued)

(52) U.S. Cl.
CPC ............ *H04W 16/18* (2013.01); *H04L 41/06* (2013.01); *H04L 41/069* (2013.01); *H04L 41/12* (2013.01);
(Continued)

(58) Field of Classification Search
CPC ... H04W 16/18; H04W 24/00; H04W 84/005; H04W 88/18; H04W 24/08; H04W 16/32;
(Continued)

(56) References Cited

U.S. PATENT DOCUMENTS 5,309,503 A   5/1994   Bruckert et al.
5,373,547 A   12/1994  Patsiokas et al.
(Continued)

FOREIGN PATENT DOCUMENTS

AU   2009-332281   7/2011
CN   101111047    1/2008
(Continued)

OTHER PUBLICATIONS

Liu, Haojie, et al. "Neural video coding using multiscale motion compensation and spatiotemporal context model." IEEE Transactions on Circuits and Systems for Video Technology 31.8 (2020): 3182-3196. (Year: 2020).*

(Continued)

*Primary Examiner* — Sharad Rampuria
(74) *Attorney, Agent, or Firm* — KNOBBE, MARTENS, OLSON & BEAR, LLP

(57) ABSTRACT

Multiple mobile cellular network (MCN) communication systems can be networked together to form a network of MCN communication systems (NOM). Each MCN communication system within the NOM can operate as an independent cellular network to provide communications between user equipment within a covered area. The MCN can be managed by a network management control center (NMCC). The NMCC can be configured generate coverage maps of the NOM and NMC system coverage areas.

19 Claims, 20 Drawing Sheets

Related U.S. Application Data continuation of application No. 16/939,333, filed on Jul. 27, 2020, now Pat. No. 11,240,677, which is a continuation of application No. 16/363,909, filed on Mar. 25, 2019, now Pat. No. 10,757,579, which is a continuation of application No. 15/699,837, filed on Sep. 8, 2017, now Pat. No. 10,244,405, which is a continuation of application No. 15/263,155, filed on Sep. 12, 2016, now Pat. No. 9,769,674, which is a continuation of application No. 14/869,895, filed on Sep. 29, 2015, now Pat. No. 9,445,280, which is a continuation of application No. 13/972,169, filed on Aug. 21, 2013, now Pat. No. 9,167,442.

(60) Provisional application No. 61/693,170, filed on Aug. 24, 2012.

(51) Int. Cl.

| | | |
|---|---|---|
| *H04L 41/044* | (2022.01) | |
| *H04L 41/06* | (2022.01) | |
| *H04L 41/069* | (2022.01) | |
| *H04L 41/12* | (2022.01) | |
| *H04L 41/22* | (2022.01) | |
| *H04L 43/16* | (2022.01) | |
| *H04W 16/32* | (2009.01) | |
| *H04W 24/00* | (2009.01) | |
| *H04W 24/04* | (2009.01) | |
| *H04W 24/08* | (2009.01) | |
| *H04W 84/00* | (2009.01) | |
| *H04W 88/18* | (2009.01) | |

(52) U.S. Cl.
CPC .............. *H04L 41/22* (2013.01); *H04L 43/16* (2013.01); *H04W 24/00* (2013.01); *H04L 41/042* (2013.01); *H04L 41/044* (2013.01); *H04W 16/32* (2013.01); *H04W 24/04* (2013.01); *H04W 24/08* (2013.01); *H04W 84/005* (2013.01); *H04W 88/18* (2013.01)

(58) Field of Classification Search
CPC ...... H04W 24/04; H04L 41/069; H04L 41/12; H04L 41/22; H04L 41/06; H04L 41/044; H04L 41/042
See application file for complete search history.

(56) References Cited

U.S. PATENT DOCUMENTS

| | | | |
|---|---|---|---|
| 5,768,501 | A | 6/1998 | Lewis |
| 6,519,465 | B2 | 2/2003 | Stilp et al. |
| 6,842,462 | B1 | 1/2005 | Ramjee et al. |
| 6,965,816 | B2 | 11/2005 | Walker |
| 7,072,657 | B2 | 7/2006 | Watanabe et al. |
| 7,246,045 | B1 | 7/2007 | Rappaport et al. |
| 7,317,717 | B2 | 1/2008 | Pankajakshan et al. |
| 7,389,534 | B1 | 6/2008 | He et al. |
| 7,486,967 | B2 | 2/2009 | Pan et al. |
| 7,535,861 | B2 | 5/2009 | Buchholz et al. |
| 7,539,158 | B2 | 5/2009 | Pan |
| 7,548,763 | B2 | 6/2009 | Pan |
| 7,567,822 | B2 | 7/2009 | Hart et al. |
| 7,573,713 | B2 | 8/2009 | Hoffman et al. |
| 7,653,414 | B2 | 1/2010 | Pan |
| 7,684,801 | B2 | 3/2010 | Suzuki et al. |
| 7,756,507 | B2 | 7/2010 | Morper |
| 7,805,372 | B2 | 9/2010 | Weiss |
| 7,817,589 | B2 | 10/2010 | Hoffman et al. |
| 7,840,230 | B2 | 11/2010 | Pan |
| 7,855,988 | B2 | 12/2010 | Pan |
| 7,856,233 | B2 | 12/2010 | Pan |
| 7,881,703 | B2 * | 2/2011 | Roundtree .............. H04L 67/04 |
| | | | 455/414.1 |
| 7,979,066 | B2 | 7/2011 | Pan |
| 8,036,158 | B2 | 10/2011 | Pan et al. |
| 8,046,420 | B2 | 10/2011 | Pan |
| 8,089,920 | B2 | 1/2012 | Pan |
| 8,107,409 | B2 | 1/2012 | Pan |
| 8,140,077 | B2 | 3/2012 | Saifullah et al. |
| 8,224,322 | B2 | 7/2012 | Pan |
| 8,270,325 | B2 | 9/2012 | Hoffman et al. |
| 8,310,990 | B2 | 11/2012 | Pan |
| 8,326,286 | B2 | 12/2012 | Pan |
| 8,340,667 | B2 | 12/2012 | Pan |
| 8,359,029 | B2 | 1/2013 | Pan |
| 8,374,124 | B2 | 2/2013 | Abusch-Magder et al. |
| 8,503,336 | B2 | 8/2013 | Rappaport et al. |
| 8,538,458 | B2 | 9/2013 | Haney |
| 8,626,210 | B2 | 1/2014 | Hicks, III |
| 8,654,749 | B2 | 2/2014 | Buchholz et al. |
| 8,676,197 | B2 | 3/2014 | Pan et al. |
| 8,688,111 | B2 | 4/2014 | Pan |
| 8,706,105 | B2 | 4/2014 | Pan |
| 8,744,435 | B2 | 6/2014 | Pan |
| 8,780,804 | B2 | 7/2014 | Pan |
| 8,811,992 | B2 | 8/2014 | Hoole |
| 8,824,969 | B2 | 9/2014 | Nakamori et al. |
| 9,055,163 | B1 | 6/2015 | Row, II et al. |
| 9,167,442 | B2 | 10/2015 | Uelk et al. |
| 9,198,221 | B2 | 11/2015 | Schemagin et al. |
| 9,204,376 | B2 | 12/2015 | Ullah et al. |
| 9,226,192 | B2 | 12/2015 | Graffagnino et al. |
| 9,264,241 | B2 | 2/2016 | Balar et al. |
| 9,338,093 | B2 | 5/2016 | Eichen et al. |
| 9,444,801 | B2 | 9/2016 | Luo et al. |
| 9,445,280 | B2 | 9/2016 | Uelk et al. |
| 9,451,646 | B2 | 9/2016 | Schemagin et al. |
| 9,686,238 | B1 | 6/2017 | Row, II |
| 9,742,729 | B2 | 8/2017 | Graffagnino et al. |
| 9,769,674 | B2 | 9/2017 | Uelk et al. |
| 9,912,640 | B2 | 3/2018 | Row, II |
| 9,924,427 | B2 | 3/2018 | Graffagnino et al. |
| 10,021,619 | B2 | 7/2018 | Schemagin et al. |
| 10,172,078 | B2 | 1/2019 | Graffagnino et al. |
| 10,244,405 | B2 | 3/2019 | Uelk et al. |
| 10,257,167 | B1 | 4/2019 | Matthews et al. |
| 10,382,393 | B2 | 8/2019 | Graffagnino et al. |
| 10,602,410 | B2 | 3/2020 | Graffagnino et al. |
| 10,631,237 | B2 | 4/2020 | Graffagnino et al. |
| 10,742,610 | B2 | 8/2020 | Row, II et al. |
| 10,750,423 | B2 | 8/2020 | Schemagin et al. |
| 10,757,579 | B2 | 8/2020 | Uelk et al. |
| 10,873,891 | B2 | 12/2020 | Hill et al. |
| 10,979,904 | B2 | 4/2021 | Kim |
| 11,134,425 | B2 | 9/2021 | Graffagnino et al. |
| 11,184,840 | B2 | 11/2021 | Graffagnino et al. |
| 11,240,677 | B2 | 2/2022 | Uelk et al. |
| 11,246,031 | B2 | 2/2022 | McCutchen et al. |
| 11,252,128 | B2 | 2/2022 | Graffagnino et al. |
| 11,582,671 | B2 | 2/2023 | Schemagin et al. |
| 11,588,790 | B2 | 2/2023 | Row, II |
| 11,671,893 | B2 | 6/2023 | Hill et al. |
| 11,743,740 | B2 | 8/2023 | Uelk et al. |
| 11,792,721 | B2 | 10/2023 | Graffagnino et al. |
| 2001/0013107 | A1 | 8/2001 | Lewis |
| 2004/0259554 | A1 | 12/2004 | Rappaport et al. |
| 2004/0259555 | A1 | 12/2004 | Rappaport et al. |
| 2006/0015745 | A1 | 1/2006 | Sukigara et al. |
| 2006/0098661 | A1 | 5/2006 | Pan |
| 2006/0178153 | A1 | 8/2006 | Tenny et al. |
| 2006/0192651 | A1 | 8/2006 | Lee |
| 2006/0234747 | A1 | 10/2006 | Pan et al. |
| 2006/0234774 | A1 | 10/2006 | Pan et al. |
| 2007/0049267 | A1 | 3/2007 | Kota et al. |
| 2007/0202847 | A1 | 8/2007 | Pan et al. |
| 2007/0232267 | A1 | 10/2007 | Pan et al. |
| 2007/0253359 | A1 | 11/2007 | Hall et al. |
| 2007/0264930 | A1 | 11/2007 | Daoudal |
| 2007/0287452 | A1 | 12/2007 | Pan et al. |
| 2008/0005380 | A1 | 1/2008 | Kawasaki et al. |

(56) References Cited

U.S. PATENT DOCUMENTS

| | | |
|---|---|---|
| 2008/0039144 A1 | 2/2008 | Pan et al. |
| 2008/0095070 A1 | 4/2008 | Chan et al. |
| 2008/0108378 A1 | 5/2008 | Gessner et al. |
| 2008/0146158 A1 | 6/2008 | Pan et al. |
| 2008/0181188 A1 | 7/2008 | Aghvami et al. |
| 2008/0268830 A1 | 10/2008 | Sharma et al. |
| 2008/0285492 A1 | 11/2008 | Vesterinen |
| 2009/0117851 A1 | 5/2009 | Malaney |
| 2009/0156213 A1 | 6/2009 | Spinelli et al. |
| 2009/0170520 A1 | 7/2009 | Jones |
| 2009/0201878 A1 | 8/2009 | Kotecha et al. |
| 2009/0205023 A1 | 8/2009 | Pan et al. |
| 2009/0227235 A1 | 9/2009 | Pan et al. |
| 2009/0232019 A1 | 9/2009 | Gupta et al. |
| 2009/0271491 A1 | 10/2009 | Pan et al. |
| 2009/0280853 A1 | 11/2009 | Brisebois et al. |
| 2009/0325584 A1 | 12/2009 | Pan et al. |
| 2009/0327819 A1 | 12/2009 | Pan et al. |
| 2010/0008306 A1 | 1/2010 | Pan et al. |
| 2010/0008369 A1 | 1/2010 | Pan |
| 2010/0027448 A1 | 2/2010 | Puthiyandyil et al. |
| 2010/0030907 A1 | 2/2010 | Pollak |
| 2010/0075668 A1 | 3/2010 | Pan et al. |
| 2010/0105373 A1 | 4/2010 | Kanade |
| 2010/0190470 A1 | 7/2010 | Raleigh |
| 2010/0197268 A1 | 8/2010 | Raleigh |
| 2010/0202455 A1 | 8/2010 | Sundaram et al. |
| 2010/0260098 A1 | 10/2010 | Ulupinar et al. |
| 2010/0260157 A1 | 10/2010 | Buchholz et al. |
| 2011/0059740 A1 | 3/2011 | Pan et al. |
| 2011/0060853 A1 | 3/2011 | Pan et al. |
| 2011/0069654 A1 | 3/2011 | Xu et al. |
| 2011/0122824 A1 | 5/2011 | Muhanna et al. |
| 2011/0130135 A1 | 6/2011 | Trigui |
| 2011/0176536 A1 | 7/2011 | De Franca Lima et al. |
| 2011/0190001 A1 | 8/2011 | Kodikara Patabandi et al. |
| 2011/0195743 A1 | 8/2011 | Jee et al. |
| 2011/0202589 A1 | 8/2011 | Piernot et al. |
| 2011/0223921 A1 | 9/2011 | Pan et al. |
| 2011/0237242 A1 | 9/2011 | Gavrilovich |
| 2011/0263253 A1 | 10/2011 | Zhao et al. |
| 2011/0275364 A1 | 11/2011 | Austin et al. |
| 2011/0300866 A1 | 12/2011 | Ali et al. |
| 2012/0002537 A1 | 1/2012 | Bao et al. |
| 2012/0002607 A1 | 1/2012 | Pan et al. |
| 2012/0029691 A1* | 2/2012 | Mockus .............. G07F 9/023 700/231 |
| 2012/0039245 A1 | 2/2012 | Wang et al. |
| 2012/0051321 A1 | 3/2012 | De et al. |
| 2012/0057568 A1 | 3/2012 | Lim et al. |
| 2012/0094659 A1 | 4/2012 | Pan et al. |
| 2012/0106454 A1 | 5/2012 | Pan et al. |
| 2012/0147874 A1 | 6/2012 | Kotecha |
| 2012/0155375 A1 | 6/2012 | Zhu |
| 2012/0224474 A1 | 9/2012 | Beser |
| 2012/0224566 A1 | 9/2012 | O'Leary |
| 2012/0252444 A1 | 10/2012 | Pan et al. |
| 2012/0269167 A1 | 10/2012 | Velev et al. |
| 2012/0276866 A1 | 11/2012 | Sennett et al. |
| 2012/0294226 A1 | 11/2012 | Racz et al. |
| 2013/0003697 A1 | 1/2013 | Adjakple et al. |
| 2013/0028097 A1 | 1/2013 | Barrett |
| 2013/0029708 A1 | 1/2013 | Fox et al. |
| 2013/0039279 A1 | 2/2013 | Pan et al. |
| 2013/0065583 A1 | 3/2013 | Pan et al. |
| 2013/0130677 A1 | 5/2013 | Pan et al. |
| 2013/0148578 A1 | 6/2013 | Pan et al. |
| 2013/0317944 A1* | 11/2013 | Huang ................. G01S 5/02521 455/457 |
| 2014/0120909 A1 | 5/2014 | Malassis et al. |
| 2014/0154967 A1 | 6/2014 | Pan et al. |
| 2014/0173388 A1 | 6/2014 | Pan et al. |
| 2014/0233412 A1 | 8/2014 | Mishra et al. |
| 2014/0315553 A1 | 10/2014 | Hoole |
| 2014/0351448 A1 | 11/2014 | Vinapamula Venkata et al. |
| 2015/0031361 A1 | 1/2015 | Timus et al. |
| 2015/0163711 A1 | 6/2015 | Norman et al. |
| 2015/0181492 A1 | 6/2015 | Schmidt et al. |
| 2015/0304282 A1 | 10/2015 | Xu |
| 2015/0319774 A1 | 11/2015 | Cai et al. |
| 2015/0358959 A1 | 12/2015 | Meshkati et al. |
| 2016/0029430 A1 | 1/2016 | Mishra et al. |
| 2016/0094999 A1 | 3/2016 | Yu et al. |
| 2016/0157281 A1 | 6/2016 | Syed et al. |
| 2016/0316406 A1 | 10/2016 | Henry et al. |
| 2016/0345192 A1 | 11/2016 | Garg et al. |
| 2016/0359738 A1 | 12/2016 | Sullenberger et al. |
| 2016/0365882 A1 | 12/2016 | Kim et al. |
| 2017/0011126 A1 | 1/2017 | Lerman et al. |
| 2017/0012870 A1 | 1/2017 | Blair et al. |
| 2017/0026823 A1 | 1/2017 | Mohammed et al. |
| 2017/0099159 A1 | 4/2017 | Abraham |
| 2017/0279708 A1 | 9/2017 | Liu |
| 2018/0192264 A1 | 7/2018 | Kwok et al. |
| 2018/0332513 A1 | 11/2018 | Cao et al. |
| 2018/0376325 A1 | 12/2018 | Xu et al. |
| 2019/0045517 A1 | 2/2019 | Logan et al. |
| 2019/0053145 A1 | 2/2019 | Ieshiro et al. |
| 2019/0150057 A1 | 5/2019 | Wang et al. |
| 2019/0320356 A1 | 10/2019 | Shaw et al. |
| 2019/0320358 A1 | 10/2019 | Knapp |
| 2019/0387028 A1 | 12/2019 | Aon et al. |
| 2019/0394738 A1 | 12/2019 | Abedini et al. |
| 2020/0037213 A1 | 1/2020 | Chen et al. |
| 2020/0092515 A1 | 3/2020 | Stern et al. |
| 2020/0236737 A1 | 7/2020 | Ye et al. |
| 2022/0191825 A1 | 6/2022 | Nord et al. |
| 2022/0232377 A1 | 7/2022 | McCutchen et al. |
| 2022/0232441 A1 | 7/2022 | Graffagnino |
| 2022/0417207 A1 | 12/2022 | Graffagnino et al. |
| 2023/0300706 A1 | 9/2023 | Schmagin et al. |
| 2023/0344799 A1 | 10/2023 | Row, II |

FOREIGN PATENT DOCUMENTS

| | | |
|---|---|---|
| EP | 1401229 A1 | 3/2004 |
| EP | 1553734 A1 | 7/2005 |
| EP | 2031920 A1 | 3/2009 |
| GB | 2452796 | 3/2009 |
| WO | WO 2007/044880 | 4/2007 |
| WO | WO 2009/100736 A1 | 8/2009 |
| WO | WO 2009/127965 A1 | 10/2009 |
| WO | WO 2014/031597 | 2/2014 |
| WO | WO 2014/031689 A1 | 2/2014 |
| WO | WO 2014/179235 | 11/2014 |

OTHER PUBLICATIONS

Cavalcanti et al., "Issues in integrating cellular networks WLANs, and MANETs: a futuristic heterogeneous wireless network", IEEE Wireless Communications 12.3:30-41 (2005).

"Digital cellular telecommunications system (Phase 2+); Universal Mobile Telecommunications System (UMTS); LTE; Interworking between the Public Land Mobile Network (PLMN) supporting packet based services and Packet Data Networks (PDN)" Technical Specification, European Telecommunication Standards Institute (ETSI), France, vol. 36PP CT3, No. V11.4.0, Apr. 1, 2013.

"Digital cellular telecommunications system (Phase 2+)(GSM); Universal Mobile Telecommunications|System (UMTS); LTE; Non-Access-Stratum (NAS) functions related to Mobile Station (MS) in idle mode (3GPP TS 23.122 version 13.4.0 Release 13)", May 2016, 52 pages.

ETSI TS 136 331 v9.00 (Sep. 2009) (Year: 2009).

Kaul, et al.: "On the adpatation of commercial smartphones to tactical environments", Military Communications Conference, 2011, Nov. 7, 2011, pp. 2205-2210.

Nystromer, "Quiclink: A Portable 3G WCDMA Cellular Service, Deployed in Minutes" Presentation, Jun. 11, 2007, pp. 1-27.

Press Release: Harris Corporation Introduces Tactical 3G Cellular Network-in-a-Box for Warfighters, Published Apr. 19, 2011, http://harris.com/view_ pressrelease.asp?pr_id=3230.

(56) References Cited

OTHER PUBLICATIONS

Press Release: Tecore Unveils the Mobile Industry's First 3G-4G Network in a Box (NIB), Published Feb. 14, 11, http://www.tecore.com/newsevents/release.cfm?newsID=164.

Sorokin et al., "Multifunction measuring system for monitoring of coverage area of mobile network operator.", International Siberian Conference on Control and Communications (SIBCON). IEEE, 2016 in 8 pages.

Tecore Networks, The Mobile Industry's First All-in-One Network Solution Supporting WCDMA, HSPA+ and L TE, first release Feb. 14, 2011, http://www.tecore.com/solutions/TecoreNetworks-Datasheet-2G-3G-4G-Networkl nABox.pdf.

International Search Report and Written Opinion dated Feb. 11, 2014, International Application No. PCT/US2013/055864.

International Search Report and Written Opinion dated Nov. 8, 2013, International Application No. PCT/US2013/055721.

International Search Report and Written Opinion dated Sep. 26, 2014, International Application No. PCT/US2014/035732.

ETSI TS 136 331 v12.3.0 (Sep. 2014) LTE Evolved Universal Terrestrial Radio Access (E-UTRA); Radio Resource Control (RRC); Protocol Specification (3GPP TS 36.331 Version 12.3.0 Release 12)(2014).

* cited by examiner

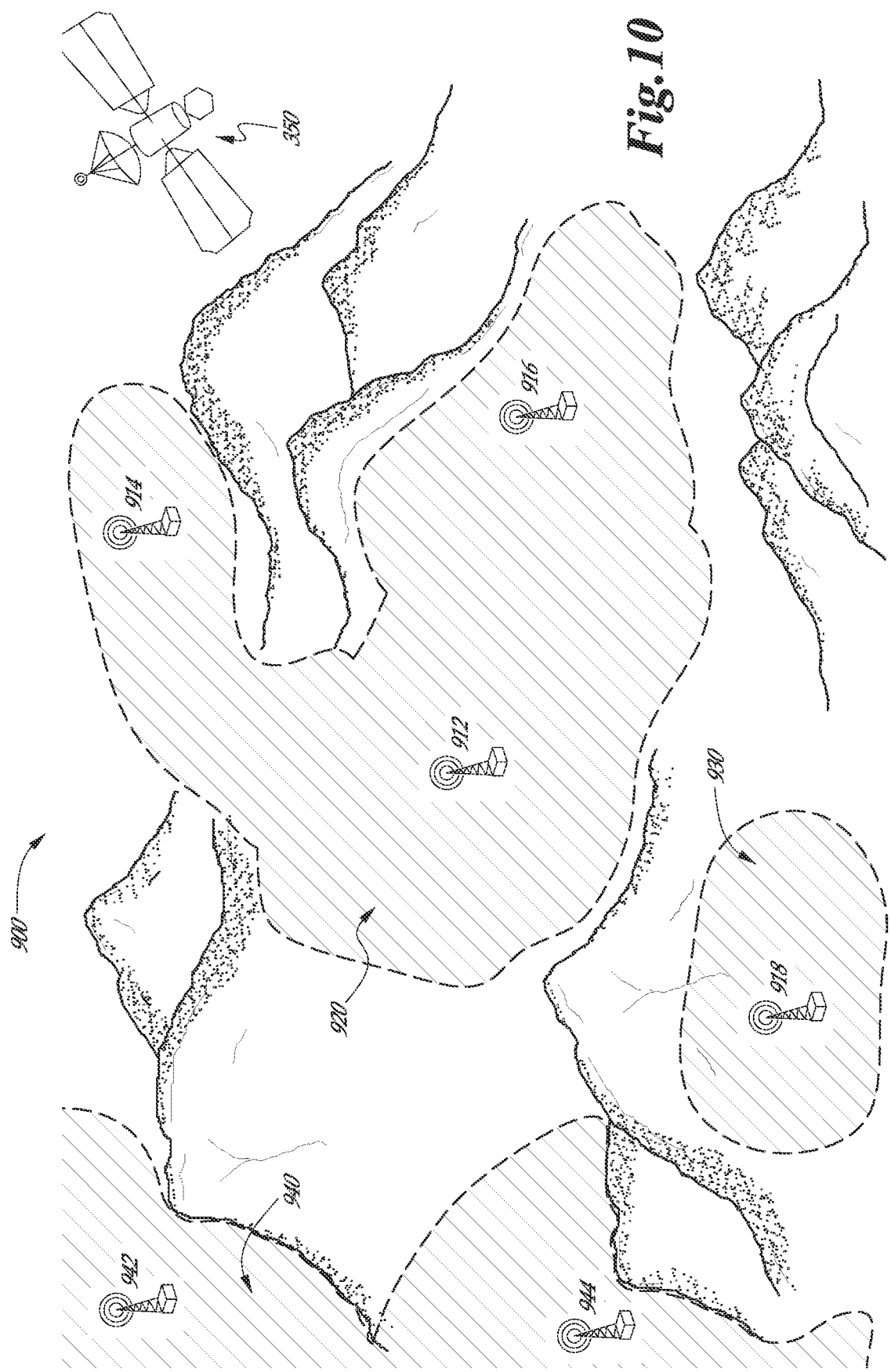

MOBILE CELLULAR NETWORKS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Cellular networks typically include multiple stationary base stations in different locations that communicate with a mobile telephone switching office (MTSO) that is remotely located from the different base stations. The MTSO determines how calls are routed between the base stations and enables the base stations to communicate with each other for handover purposes. If a base station cannot communicate with the MTSO, or the rest of the network, all communications at that base station are lost and user equipment (UE) in corresponding network areas cannot communicate with other UEs, even if the UEs trying to communicate with each other are in the same network area. In addition, the base stations are built to be stationary so that UEs within a particular area always have network access.

Many locations throughout the world lack a network infrastructure that would enable users to communicate via a typical telephone or cellular network. In such locations it can be difficult for users to communicate effectively. Users must often rely on technologies that are more expensive, have lower bandwidth, or have limited use distances, such as satellite phones, half-duplex radio transceivers, etc. Furthermore, these locations often lack the resources to create the network infrastructure necessary for a cellular network, such as cell towers, base stations, switching stations, etc. In some circumstances, such as war zones, etc., building the network infrastructure for such communications is not feasible due to the transient nature of military personnel and equipment. For example, for a communications command center in a battlefield area, mobility can be an important feature to allow the command center to adapt to the changing battlefield conditions. Thus, stationary network technologies can be ineffective.

SUMMARY

One device that can be used to improve communications in such environments is a mobile cellular network (MCN) communication system, also referred to as a network-in-a-box (NIB). The NIB can include all of the components of a typical cellular network, but residing in one device. Further, the NIB does not need to communicate with other nodes, other base stations, or an MTSO to provide complete cellular network functionality to UEs within a covered area. One example of a commercially available NIB, or MCN communication system, is the Xiphos™ available from Oceus Networks.

In addition, as the NIB moves, the network coverage moves with it. Thus, NIBs can create a cellular network within a limited area that allows user equipment within that area to communicate with each other.

The present disclosure provides a network management control center (NMCC) that can be used to manage the NIBs and networks of NIBs. The NMCC provides a network management system that aggregates all of the network information from the NIBs and provides a centralized network configuration and management tool. The NMCC can also generate network coverage maps that provide real-time tracking of network coverage.

BRIEF DESCRIPTION OF THE DRAWINGS

FIGS. 9-10 are diagrams of an embodiment of network coverage maps for NOMs in a region.

FIGS. 11A-11D are illustrative embodiments of a user interface for an NMCC.

FIG. 13 is a flow diagram illustrative of an embodiment of a routine implemented by an NMCC for generating a network coverage map.

DETAILED DESCRIPTION

To increase the range of a mobile cellular network (MCN), multiple MCN communication systems (or NIBs) can be networked together to create a network of MCN communication systems, also referred to herein as a NOM. The different MCN communication systems within the NOM can communicate with each other using a variety of communication technologies, including satellite communication, microwave or radio wave communication, OFDM, WiMAX, etc. In addition, the NOM can communicate with other NOMs, such as, for example, via MCN communication systems configured as master devices. Furthermore, should one of the MCN communication systems become disabled, such as a master device, the remaining MCN communication systems in the NOM can communicate to reorganize the NOM.

The MCN communication system can also perform handover operations when user equipment moves from one coverage area to another coverage area within the NOM. Furthermore, if a MCN communication system moves from one location to another, the NOM can allocate affected user equipment between the moving MCN communication system and other MCN communication systems in the area.

Figure 1A:
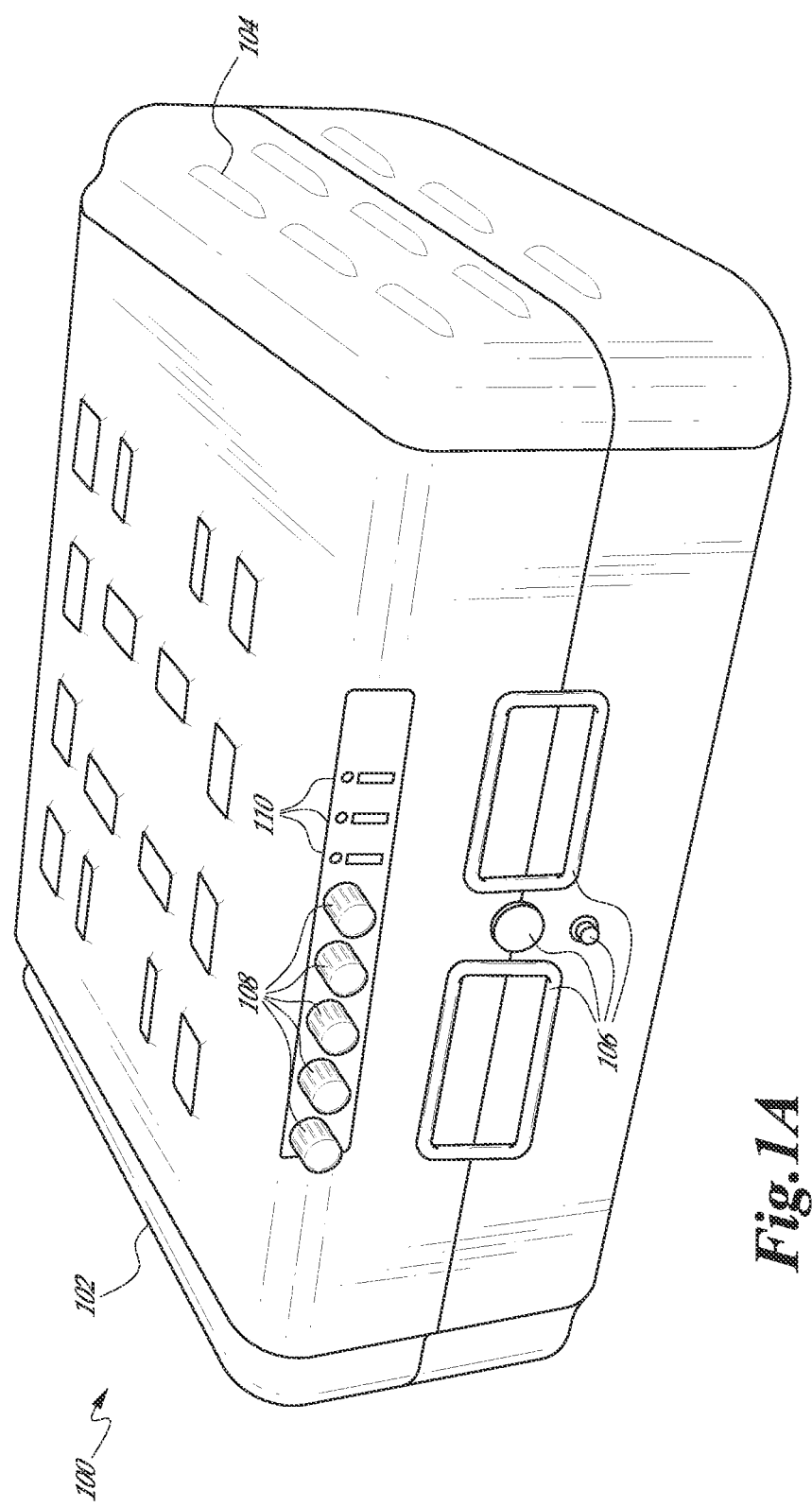
FIG. 1A is a diagram of an encasement for a mobile cellular network (MCN) communication system.

FIG. 1A is a diagram of an encasement 102 for a mobile cellular network (MCN) communication system 100. The components of the MCN communication system 100 will be described in greater detail with reference to FIG. 1B. The encasement 102 can be formed from a stiff polymer or other material and can be ruggedized to withstand harsh external environments, such as battlefield environments. The encasement 102 can include air vents 104 to improve cooling of the components of the MCN communication system 100.

The encasement 102 can also include locking mechanisms 106, ports 108 and status indicators 110. The locking mechanisms 106 can be used to ensure the components of the MCN communication system 100 remain protected within the encasement 102. The locking mechanisms can include latches, buttons, keys, etc., to lock the encasement 102.

The ports 108 can provide communication pathways from the MCN communication system 100 to exterior devices, such as an antenna, computer, tablet, personal computing device and the like. The ports 108 can also include power and grounding connections. The ports 108 can include an RF port, Ethernet ports, USB ports, power supply connectors, serial ports, etc.

The status indicators 110 can provide the status of the components of the MCN communication system 100. The status indicators can indicate whether the MCN communication system 100 has power, is active, and/or whether there is an alarm condition. Furthermore, the status indicators 110 can indicate the severity of an alarm condition of one or more of the components. In addition, each component can be associated with one or more status indicators 110. In this way a user can quickly assess the status of the MCN communication system 100. In some embodiments the status indicators change color based on the severity of an alarm condition.

Figure 1B:
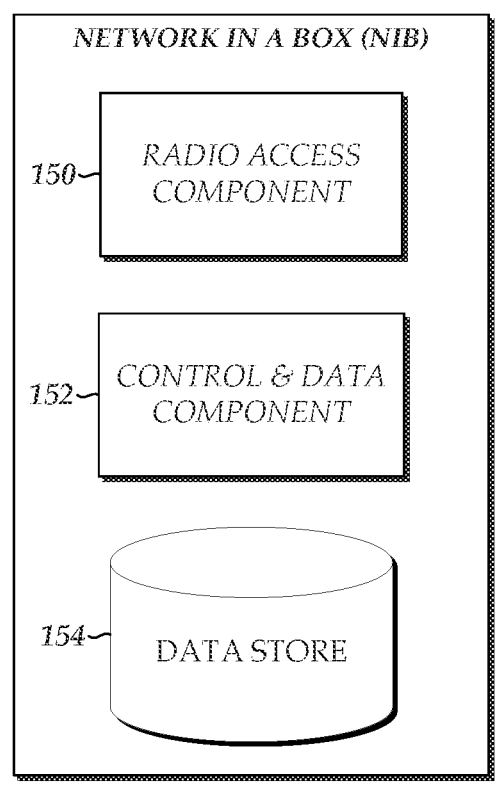
FIG. 1B is a block diagram of an embodiment of a MCN communication system.

FIG. 1B is a block diagram of an embodiment of a MCN communication system 100 and its components. In the illustrated embodiment, the MCN communication system 100 includes a radio access component 150, control and data component 152 and a data store 154. The MCN communication system can further include and/or can communicate with an antenna, satellite dish, and the like, to receive data from UEs, other MCN communication systems, satellites, and the like. In an all-IP network architecture, the received data can all be in the form of IP data packets. In addition, the MCN communication system 100 can communicate with multiple base stations to increase its coverage area.

The control and data component 152 can be implemented using one or more computer processors, FPGAs, microcontrollers, etc., and performs the various operations of the MCN communication system 100. In an all-IP network architecture, such as a 4G LTE network, the control and data component 152 can include a packet data network gateway (PGW), serving gateway (SGW), mobility management entity (MME), and policy and charging rules function (PCRF).

The PGW can provide the IP traffic interface between the UE and external IP networks. Together with the SGW, the PGW can route all IP packets between the UE and the external IP network. The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-MCN communication system handovers. For idle state UEs, the SGW can terminate the downlink data path and trigger paging when downlink data arrives for the UE. The SGW can also manage and store UE contexts, e.g. parameters of the IP bearer service, network internal routing information.

The MME can be responsible for attaching and detaching a UE from the MCN communication system and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the MCN communication system.

Similarly, the control and data component 152 can perform the attachment and detachment of UEs, authentication procedures, gateway selection, managing PDN connections, UE tracking and paging, etc. The control and data component 152 can also handle the user data between the radio access component and an external IP network, packet routing and forwarding, handover functions between MCN communication systems, packet buffering initiation of network triggered service request procedures, quality of service policy enforcement, static policy, subscriber location management, subscriber data, and the like.

The control and data component 152 can perform additional procedures as will be described herein. For example, the control and data component 152 can communicate with other MCN communication systems to create a NOM, establish communications between UEs that are within the coverage area corresponding to the MCN communication system, identify MCN communication systems associated with UEs in other coverage areas, identify MCN communication systems that are available for handover operations, perform the synching operations with other MCN communication systems, identify non-responsive MCN communication systems, etc.

The data store 154 can include data regarding the UEs in communication with the MCN communication system 100 and within the coverage area corresponding to the MCN communication system 100, such as UE location, authentication keys, etc. In some embodiments, such as an all-IP network architecture or 4G LTE network, the data store 154 can include a home subscriber server (HSS).

The HSS can include subscription information for all UEs associated with the MCN communication system, or within a NOM. The HSS can store, for example, authentication parameters, security keys, and subscription information for UEs within the NOM or associated with the MCN communication system. Furthermore, the HSS can include subscriber location information and be involved with subscriber data handling, authentication procedures, etc.

Similarly, the data store 153 can further include data identifying other MCN communication systems within the NOM, location information of the MCN communication system within the NOM, communication protocols, data regarding the Master Device and Secondary devices of the NOM, data identifying all the UEs within the NOM and the coverage areas where the UEs are located, etc. The data in the data store 154 can be used by the control and data component 152 to manage the UEs in the coverage area.

As mentioned previously multiple MCN communication systems can be networked together to form a NOM. The MCN communication systems in the NOM can implement an all-IP based communication architecture, such as 4G LTE, to provide further functionality and flexibility. Furthermore, each MCN communication system in a NOM can include a unique identifier, such as an IP address, and each UE associated with each MCN communication system can include its own unique identifier, which can also be an IP address. The UEs can include, but are not limited to, cell phones, smart phones, tablet computers, personal computers, tracking devices, targeting devices, weapons systems, and/or any portable electronic device configured to communicate with one or more MCN communication systems.

To create a NOM, multiple MCN communication systems can be identified for association. The MCN communication systems can be identified by a user and/or automatically identified based on proximity to each other, radio signal communications between MCN communication systems, hierarchical information, and the like, as will be described in greater detail below. Further, the MCN communication systems can be associated together by associating their unique identifiers in a data store of one of the MCN communication system, or in some other location.

Once the MCN communication systems are associated together, one MCN communication system can be identified as the Master MCN communication system ("Master Device"), while the remaining MCN communication systems can be identified as the secondary MCN communication systems ("Secondary Device(s)"). Additional MCN communication systems can be added by identifying additional MCN communication systems, as described above, and associating the additional MCN communication systems with the MCN communication systems in the NOM.

The Master Device can retrieve data from each associated MCN communication system, such as the unique identifiers of the UEs within each coverage area, location information, and other configuration information to generate a database of all UEs throughout the NOM. The Master Device can then share the database of information, or parts thereof, with all of the Secondary Devices to ensure that every MCN communication system in the NOM includes the desired information. The Master Device can communicate with the Secondary Devices to retrieve and synch data via any number of communication technologies, including satellite communication, microwave or radio wave communication, OFDM, WiMAX, etc.

The data that is shared with all the MCN communication systems in the NOM can include a look-up table identifying the other MCN communication systems within the NOM, unique identifiers to communicate with different components of the MCN communication systems within the NOM, and the coverage area where the UEs in the NOM are located. Thus, when a first UE (UE1) within a coverage area (CA1) attempts to transmit data to a second UE (UE2), the UE1 can communicate with a first MCN communication system (the MCN communication system corresponding to the CA1) to obtain the unique identifier of UE2 and/or transmit the data for UE2 via the first MCN communication system.

In some embodiments, the MCN communication system can function in an independent mode where communication with other MCN communication systems or a backhaul communication is limited or non-existent. In such embodiments, upon receiving the request, the first MCN communication system can refer to the look-up table to determine whether the UE2 is within the CAL. If the UE2 is within CA1, the first MCN communication system can transmit the data from UE1 to UE2. The data can include any one or more types of communications, including, but not limited to, voice data, video data, e-mail, SMS data, picture data, files, etc. If the first MCN communication system determines that the UE2 is not within the CA1, the first MCN communication system can transmit a message to UE1 that communication with UE2 is not available, etc.

The MCN communication system can also function in a networked mode such that communication with UE2 is available whether or not the UE2 is located in CA1. When in the networked mode, when the first MCN communication system receives the data for transmission to UE2, the MCN communication system can forward the data for transmission to a backhaul link to be routed to UE2, regardless of whether UE2 is located within CA1. Thus, in some circumstances, when UE1 and UE2 are located in CA1, the data from UE1 will be transmitted from the first MCN communication system to the backhaul link and back down to be routed to UE2. In some embodiments, rather than using a backhaul link, the MCN communication system can communicate data from UE1 located in CA1 to UE2 located in CA2 via direct communication with another MCN communication system or via an intermediary, such as a satellite communication, microwave station, etc. Thus, in some embodiments, no backbone network is required to allow the MCN communication system to communicate directly, or through one or more intermediary MCN communication systems, with another MCN communication system. In some embodiments, the MCN communication system can automatically switch between the independent mode and the networked mode based on whether communication with other MCN communication systems or a backhaul communication is available.

As used herein, adjacent coverage areas can refer to coverage areas that have overlapping coverage and/or coverage areas that are close enough to each other such that a UE can move from one coverage area to another coverage area without losing the ability to communicate with at least one MCN communication system. Furthermore, as used herein, adjacent MCN communication systems refers to MCN communication systems corresponding to adjacent coverage areas.

In addition, to the look-up table of the MCN communication systems within the NOM and the UEs within the NOM, the Master Device can include information regarding communication with other devices outside the NOM, such as other Master Devices in other NOMs, other typical cellular networks, etc.

The NOM can also handle UE handover operations as well. To aid in handover operations, each MCN communication system can include a look-up table of other MCN communication systems with which a handover operation can be completed. For example, MCN communication systems that are in adjacent coverage areas can complete handover operations, while the MCN communication systems that are not in adjacent coverage areas cannot complete handover operations. To generate the look-up table, the MCN communication system can identify other MCN communication systems within its covered area or adjacent, communicate with a Master Device, and/or refer to shared information previously transmitted from the Master Device.

To identify and track UE within their covered area, the MCN communication systems can sense a radio signal from the UE within the covered area or transmit broadcast messages and await replies from the UE. Upon identifying a new UE in the covered area, the MCN communication system can identify whether the UE is associated with another MCN communication system and, if so, communicate with the other MCN communication system to complete a handover operation. For example, if the UE1 is moving from the CA1 to an adjacent CA2, the MCN communication system corresponding to the CA1 can refer to the lookup table and determine that the UE1 is currently associated with the MCN communication system corresponding to the CA2. Accordingly, the two MCN communication systems can communicate to ensure any communication is not lost during the transition of the UE1 from the CA1 to the CA2.

As the MCN communication systems are likely to be moved during operation, in some embodiments, the Master Device can track the location of each MCN communication system within the NOM. In this way, the Master Device can use its own location information and the location information of the Secondary Devices to determine which MCN communication systems are adjacent and can complete a UE handover with other MCN communication systems.

If the Master Device determines that an MCN communication system has moved, it can update the relationship information with the Secondary Devices. Furthermore, if the Master Device detects movement, it can query the moving MCN communication system more frequently to ensure that all the MCN communication systems within the NOM have the most current information regarding adjacent MCNs, etc.

In addition, if a moving MCN communication system begins to detect a weak signal with a UE, the MCN communication system can communicate with the Master Device to determine what, if any, other MCN communication systems are available in the area of the UE. Based on the location information kept by the Master Device, the MCN communication system can identify a second MCN communication system for a possible handover of the UE.

In some embodiments, the Master Device can include location and adjacent coverage area information as part of the data that is shared with the Secondary Devices. Accordingly, in such embodiments, the MCN communication systems can refer to the shared data to identify the second MCN communication system for a possible handover of the UE.

In addition, Master Devices can use location information to track the location of MCN communication systems that are not part of the NOM. If a MCN communication system that is not part of the NOM moves such that it becomes adjacent to an MCN communication system in the NOM, the Master Device can incorporate the new MCN communication system as part of the NOM, or at least enable it to complete handover operations with the MCN communication system to which it is adjacent.

The Master Device can also monitor the activity and well-being of the MCN communication systems in the NOM. For example, if a Master Device does not receive any communication information from a MCN communication system for a threshold period of time, the Master Device can query the MCN communication system. If there is no response, the Master Device can sound an alarm, and/or perform any number of different functions. For example, the Master Device can delete, or make unavailable for communication, the UEs within the coverage area corresponding to the non-responsive MCN communication system. This information can then be shared with any remaining Secondary Devices.

Similarly if one or more Secondary Devices do not receive any communication information from the Master Device for a threshold period of time, the Secondary Device can query the Master Device. If the Master Device is unresponsive, a Secondary Device can then become the Master Device. In addition, the new Master Device can delete, or make unavailable for communication, the UEs within the coverage area corresponding to the non-responsive Master Device. The Secondary Device selected as the new Master Device can be based on any number of parameters, such as location, age, firmware/software updates/revisions, etc., as will be described in greater detail below.

Figure 2:
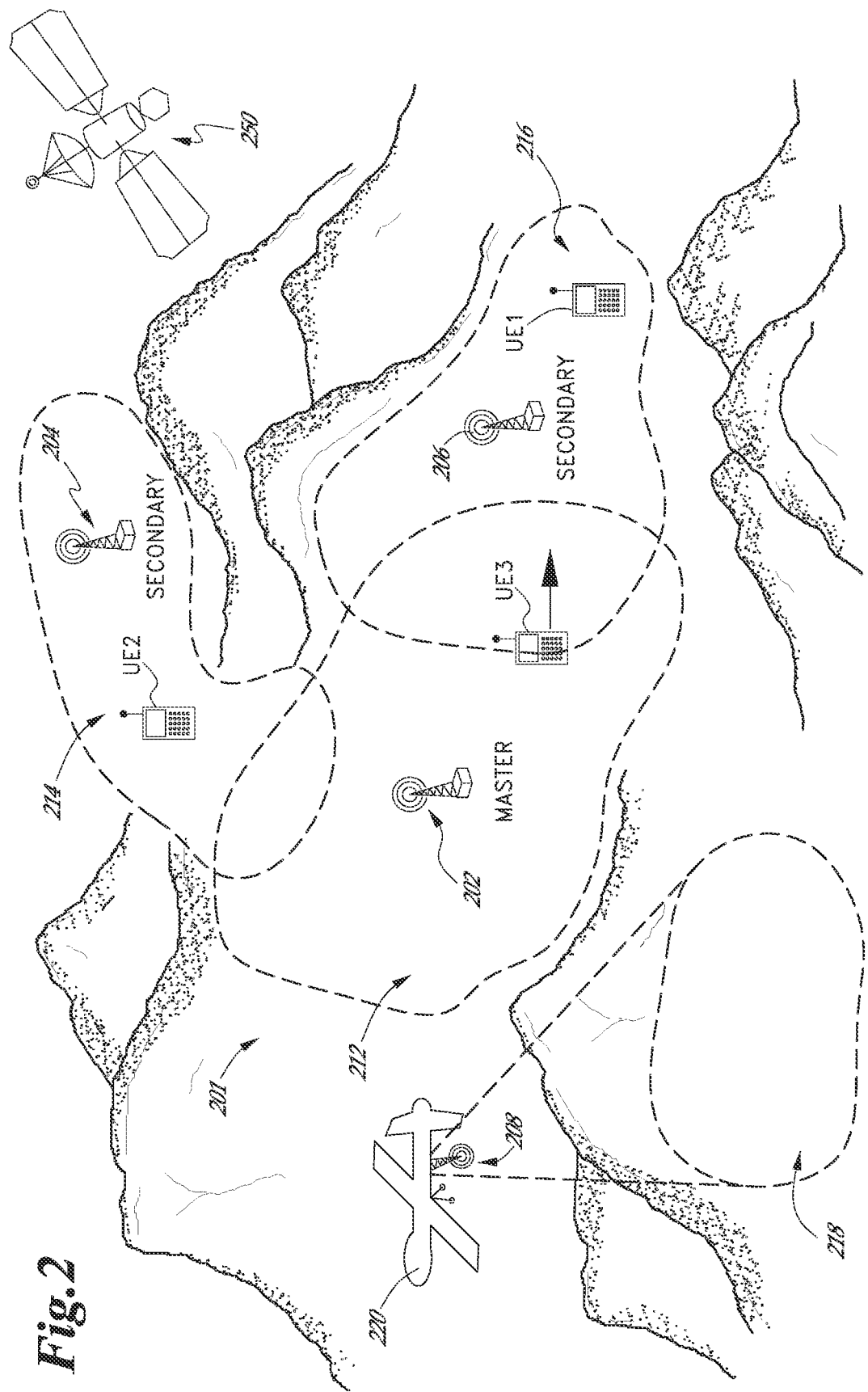
FIG. 2 is a diagram of an embodiment of a network of MCN communication systems (NOM) in a region.

FIG. 2 is a diagram of an embodiment of a NOM 201 and a satellite 250. In the illustrated embodiments, the NOM 201 includes a Master Device 202 and three Secondary Devices 204, 206, 208. In addition, the NOM 201 includes the coverage area 212 that corresponds to the Master Device 202 and the coverage areas 214, 216, 218 that correspond to the Secondary Devices 204, 206, 208, respectively.

In the illustrated embodiment, some of the coverage areas 212, 214, 216 are managed by MCN communication systems 202, 204, 206 that are on the ground. However, as illustrated with MCN communication system 208, the MCN communication systems can be located on a moving object, such as an airplane, drone 220, automobile, ship, boat, or other vehicle. Furthermore, as illustrated, the coverage areas 212, 214, 216 are adjacent to each other, while coverage area 218 is not adjacent to any of the other coverage areas.

The MCN communication systems 202, 204, 206, and 208 that form the NOM 201 can communicate with each other via any one of, or a combination of, satellite communication, microwave or radio wave communication, OFDM, WiMAX, etc. In the illustrated embodiment, the MCN communication systems 202, 204, 206, and 208 communicate via the satellite 250.

NOM Creation

As mentioned previously, the MCN communication systems 202, 204, 206, and 208 can be networked together to form the NOM 201. Each MCN communication system 202, 204, 206, and 208 can be identified using a unique identifier, such as an IP address, MAC address, device name, random number, etc.

In some embodiments, the MCN communication systems 202, 204, 206, and 208 can be associated together using the unique identifiers. For example, a user at one of the MCN communication systems can identify the MCN communication systems 202, 204, 206, and 208 using a user interface and then associate them with each other.

In certain embodiments, the MCN communication systems 202, 204, 206, and 208 can be automatically associated together based on one or more factors. For example, the MCN communication systems 202, 204, 206, and 208 can be associated based on their proximity, radio communications, location, hierarchical information, etc.

In some embodiments, an MCN communication systems (e.g., 202) can perform a search for other MCN communication systems within its covered area by broadcasting a query for other MCN communication systems to answer. An MCN communication system (e.g., 202) can also identify other MCN communication systems that are in proximity to it by querying location information of other MCN communication systems via a satellite communication. Other MCN communication systems (e.g., 204, 206, 208) that can be associated with the querying MCN communication system can respond with their location. If the location is within a predefined or dynamically selected distance, the MCN communication systems can be associated. For example, in some embodiments, adjacent MCN communication systems can be associated. In certain embodiments, MCN communication systems within the predefined area can be associated regardless of whether they are adjacent.

In addition, MCN communication systems can be associated based on an identification of the MCN communication system and/or a group or hierarchy identification. For example, if a company of soldiers has multiple MCN communication systems (e.g., 202, 204, 206, 208) spread out across different platoons, the MCN communication systems 202, 204, 206, 208 corresponding to the different platoons can be automatically associated together to form a NOM based on their relationship within the company. For example, a look-up table containing identifiers of the platoons of a company and the identifiers of the MCN communication systems associated with platoons can be used to associate the MCN communication systems together to form a NOM. In some embodiments, this can be done regardless of the distance between the platoons.

In some embodiments, upon detecting the other MCN communication systems 204, 206, 208, the MCN communication system 202 can perform a security check to determine whether it can associate with the other MCN communication systems 204, 206, 208. If the second MCN communication systems 204, 206, 208 pass the security check, the MCN communication systems 202, 204, 206, 208 can be associated to form a NOM. In certain embodiments, upon detecting the MCN communication systems 202, 204, 206, 208 are associated without a security check.

Once the MCN communication systems 202, 204, 206, 208 have been associated, in some embodiments, a user can select one of the MCN communication systems 202, 204, 206, and 208 as the Master Device. In the illustrated embodiment, MCN communication system 202 is selected as the Master Device 202. The remaining MCN communication systems 204, 206, and 208 are then identified as the Secondary Devices 204, 206, and 208. However, any one of the MCN communication systems 202, 204, 206, 208 can be selected as the Master Device.

In certain embodiments, the Master Device 202 can be selected, or identified, automatically based on one or more factors. For example, the Master Device 202 can be selected based on its elevation. The elevation can be obtained from a GPS unit or similar device. For example, coverage areas corresponding to MCN communication systems at higher elevations can have a greater coverage area and therefore be more desirable as a Master Device. Further, in battlefield conditions, MCN communication systems at higher elevations may be safer. Accordingly, in some embodiments, the MCN communication system at a higher elevation or the highest elevation can be selected as the Master Device. In certain embodiments, the MCN communication system at a lower elevation, or the lowest elevation, can be selected as the Master Device.

In some embodiments, the Master Device is selected based on which MCN communication system has the strongest and/or most reliable connection with a backhaul link. In certain embodiments, the Master Device 202 can be selected based on the range of the corresponding coverage area. The MCN communication systems can analyze radio strength, frequency spectrum, surrounding terrain features (e.g., elevation changes, climate, etc.), and other factors to estimate the range of the different coverage areas. The terrain features can be obtained by determining the location of the MCN communication systems using a global-positioning satellite system (GPS) or other location identification system and using one or more maps, such as a topographical map, etc. In some embodiments, the MCN communication system corresponding to the coverage area with the largest coverage area can be selected as the Master Device. In certain embodiments, the coverage area with the smallest range or middle range can be selected as the Master Device. In certain embodiments, the Master Device 202 can be selected based on its location. For example, the MCN communication system that is closest to or farthest away from a command center can be selected as the Master Device. Location information of the command center can be compared with location information of the MCN communication systems to determine the distance between the them.

Furthermore, the Master Device can be selected based on an identifier of the MCN communication systems and/or an identifier of the group associated with the MCN communication system. With reference to the example above regarding the NOM composed of MCN communication systems associated with platoons in a company, the MCN communication system associated with the company commander can be automatically designated as the Master Device.

Once the Master Device 202 has been selected, the Master Device 202 obtains various types of information from the Secondary Devices 204, 206, 208. For example, the Master Device 202 can obtain the UE information regarding the UEs in the different coverage areas 212, 214, 216, 218. The Master Device 202 can also obtain additional information from the MCN communication systems 202, 204, 206, 208, such as the location of each MCN communication systems 202, 204, 206, 208, network configuration parameters, error information, and the like. In some embodiments, the Master Device 202 does not obtain any information, but simply passes information along to the Secondary Devices 204, 206, 208, such as UEs that are registered with the NOM and other NOM data.

Once the Master Device 202 has obtained the information from the different MCN communication systems 202, 204, 206, 208, the Master Device 202 generates data that is to be shared between the MCN communication systems 202, 204, 206, 208. The generated data can also be referred to as NOM data. The Master Device transmits the NOM data to all of the Secondary Devices 204, 206, 208. In this way, all of the MCN communication systems 202, 204, 206, 208 include all of the information regarding the NOM. In some embodiments, the NOM data includes all the data found on the Master Device, including information regarding other NOMs. In certain embodiments, the NOM data only includes data concerning a particular NOM.

Additional MCN communication system can be added to the NOM 201 as desired. In some embodiments, a user can associate a new MCN communication system to the other MCN communication systems that already form part of the NOM 201. In certain embodiments, a new MCN communication system can be added based on the factors described above, such as proximity to the NOM, hierarchical information, etc. Once the new MCN communication system is added, the Master Device 202 retrieves the user data and other information from the new MCN communication system. The Master Device 202 updates its NOM data and then transmits the NOM data to all of the Secondary Devices 204, 206, 208, and the new MCN communication system.

Communication Between UEs in a NOM

The NOM 201 allows for communications between UEs in different coverage areas. As part of the NOM data received from the Master Device 202, each of the Secondary Devices 204, 206, 208 can include information regarding where the UEs in the NOM are located. Using this information, the Secondary Devices 204, 206, 208 can transmit data between UEs in different coverage areas. If one UE requests a transmission of data to another UE in the same coverage area, the corresponding MCN communication system can authenticate the requesting UE by communicating with the Master Device. In some embodiments, such as when the MCN communication system is in networked mode, once the UE has been authenticated, the data from the UE can be transmitted to a backhaul communication link for routing.

For example, if the UE1, located in coverage area 216, seeks to transmit data to the UE2, in the coverage area 214, the UE1 can send the data for transmission to the Secondary Device 206. If the Secondary Device 206 is in networked mode it can authenticate the UE1 with the NOM by communicating with the Master Device 202. Once authenticated, the Secondary Device 206 can forward the data from the UE1 to the backhaul communication link via satellite 250 for routing to UE2. Using standard IP routing techniques, the data will eventually be routed to the UE2 via the MCN communication system 204.

However, if the UE1 and the UE2 are both located in coverage area 216 and the MCN communication system 204 is in independent mode, the MCN communication system 204 can authenticate UE1 by reviewing the NOM data and then transmitting the data to the UE2. In some embodiments, even when in networked mode, the MCN communication system 204 can authenticate the UE1 using the NOM data stored thereon, determine whether the UE2 is in the coverage area 216, and, if so, transmit the data to the UE2 without using the backhaul communication link, or communicating with the Master Device 202.

Handover Operations

The NOM 201 also allows UEs to roam between adjacent coverage areas. In the illustrated embodiment, coverage areas 212, 214, and 216 are adjacent, and a handover occurs when a UE moves from one coverage area into another adjacent coverage area. During the movement from one coverage area to the other coverage area, the two corresponding MCN communication systems communicate to handover the communications of the UE so that any communication links between the UE and any other UEs are not lost.

For example, if UE3 is located in coverage area 212 and begins moving into coverage area 216, the Secondary Device 206 can detect the presence of UE3 within coverage area 216. As UE3 continues to move into the coverage area 216, the Master Device 202 detects a weakening radio signal. As the radio signal between UE3 and the Secondary Device 206 strengthens and the radio signal between UE3 and the Master Device 202 weakens, the Master Device 202 and the Secondary 206 can communicate directly to ensure that any communication between the UE3 and any other UEs is not lost. In certain embodiments, the Master Device 202 and the Secondary Device 206 can communicate via a backhaul link, such as via a satellite or other device. In addition, the Master Device 202 can update the NOM data regarding the location of UE3 and transmit the updated NOM data to the Secondary Devices 204, 206, 208. Thus, every MCN communication system 202, 204, 206, 208 can include the updated NOM data with the location of all the UEs within the NOM and other information.

Figure 3:
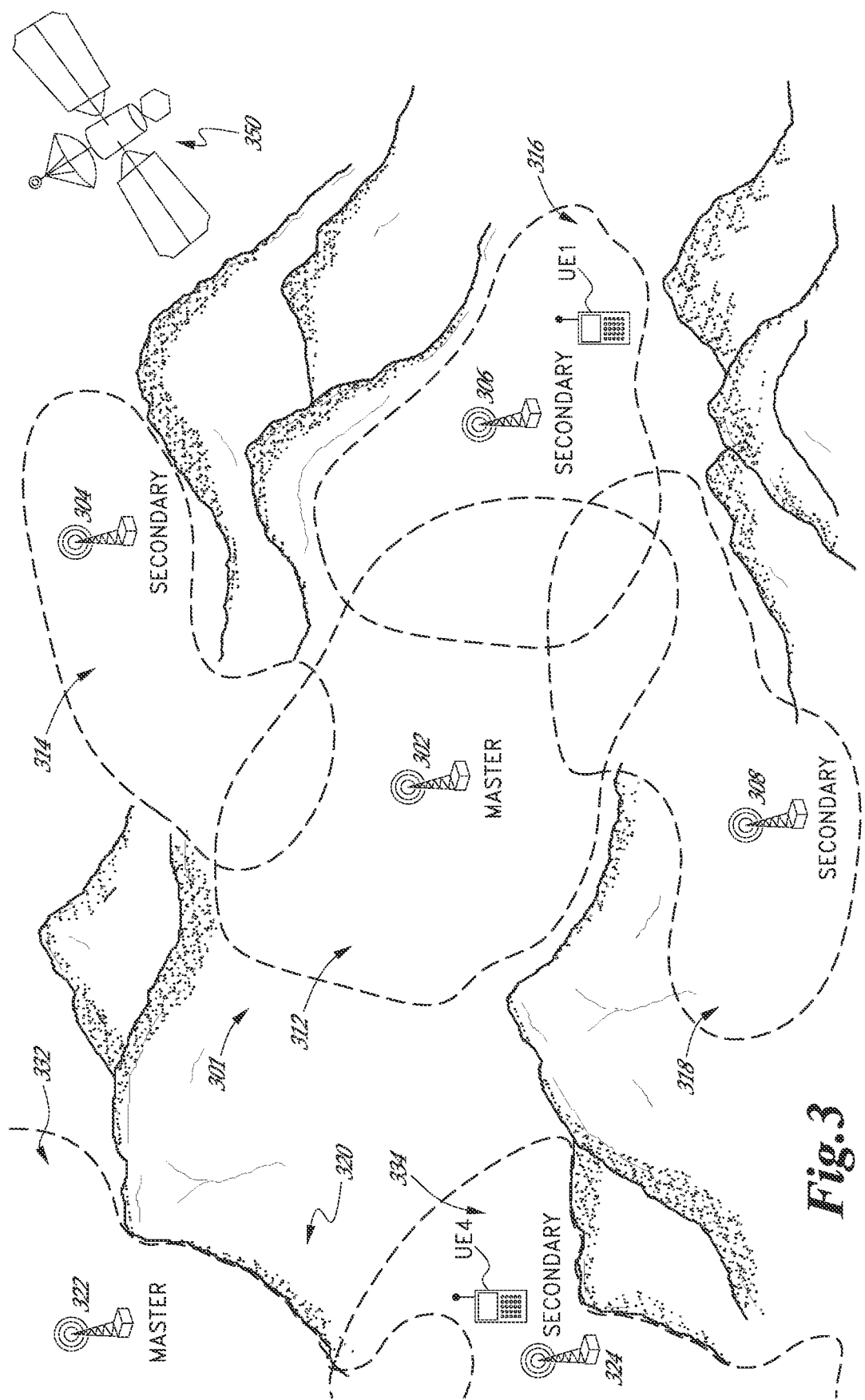
FIGS. 3-5 are diagrams of embodiments of multiple NOMs within a region.

FIG. 3 is a diagram of an embodiment of multiple NOMs: NOM 301 and NOM 320, and a satellite 350. The NOM 301 includes a Master Device 302, its corresponding coverage area 312, three Secondary Devices 304, 306, 308, and the coverage areas 314, 316, 318 corresponding to the Secondary Devices, 304, 306, 308, respectively. The NOM 320 includes a Master Device 322, its corresponding coverage area 332, one Secondary Device 324, and its corresponding coverage area 334.

The NOMs 301, 320 operate in a manner similar to the NOM 201, describe above with reference to FIG. 2. Furthermore, the NOMs 301, 320 can communicate with each other via the Master Devices 302 and 322. For example, in the illustrated embodiment, the Master Devices 302 and 322 can communicate via the satellite 350. In some embodiments, the Master Devices in different NOMs can communicate using any one or a combination of communication technologies, similar to the communication technologies used for communication between MCN communication systems within a NOM, described previously.

In addition to communication links between UEs in different coverage areas within a NOM, communication links between UEs in different NOMs can be established. For example, if the UE1, located in coverage area 316 of NOM 301, requests to communicate with the UE4, located in the coverage area 334 of the NOM 320, the UE1 can request a communication link to the UE4 from the Secondary Device 306. The Secondary Device 306 can review the NOM data of NOM 301 to determine where the UE4 is located.

In some embodiments, the NOM data in the Secondary Device 306 does not include information regarding other NOMs. In such embodiments, the Secondary Device 306 will be unable to identify the location of the UE4, but can communicate the communication request to the Master Device 302. The Master Device 302 can communicate with the Master Device 322 of the NOM 320 to determine whether the UE4 is located within the NOM 320. The NOM 320 can review its NOM data and determine that the UE4 is located within the coverage area 334.

The Master Device 322 can supply communication link data to allow a communication link between the UE1 in coverage area 316 and the UE4 in coverage area 334 to the Master Device 302. In turn, the Master Device 302 can provide the communication link data to the Secondary Device 306. Using the communication link data, the Secondary Device 306 can establish the communication link between the UE1 and the UE4.

In certain embodiments, the NOM data in the Secondary Device 306 can include information regarding other NOMs (e.g., the NOM 320). In such embodiments, the Secondary Device 306 can request the Master Device 302 to communicate with the Master Device 322 of the NOM 320, and to establish the communication link between the UE1 and the UE4. Alternatively, the Secondary Device 306 can communicate with the NOM 320 without the aid of the Master Device 302.

Moving MCN Communication Systems

Figure 4:
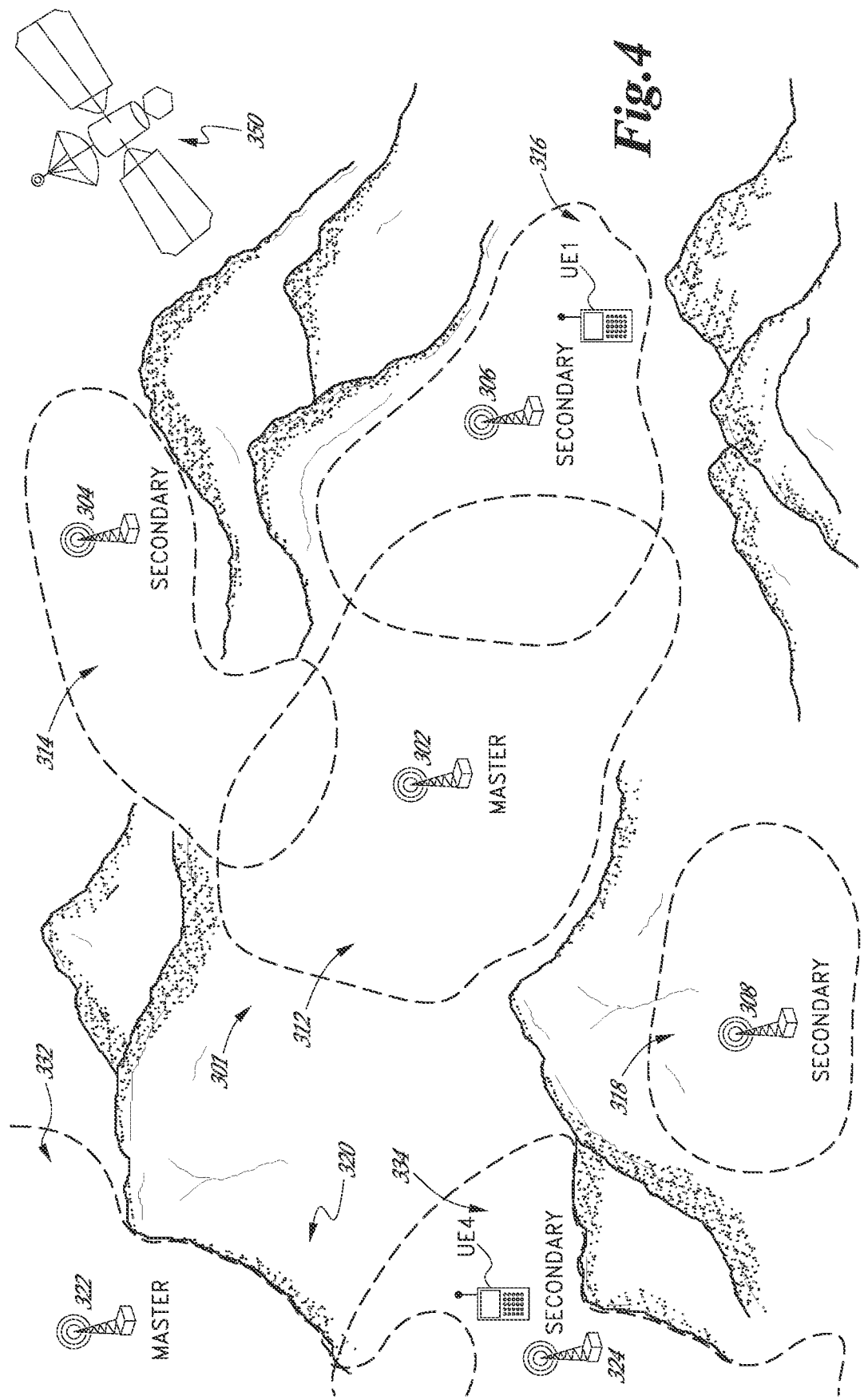

FIG. 4 is a diagram of an embodiment of the NOMs 301, 320 where the Secondary Device 308 has moved away from the MCN communication systems in the NOM 301, and is no longer adjacent to the Master Device 302 and the Secondary Device 306. As described previously with reference to FIG. 2, despite the distance between coverage area 318 and the other coverage areas in the NOM 301, the UEs within the coverage area 318 can still communicate with the UEs in the NOM 301. However, as the coverage area 318 is no longer adjacent to the coverage area 312 and the coverage area 316, handover functionality is lost. For example, UEs cannot move from the coverage area 318 to the coverage area 312 or the coverage area 316 without losing a radio or communication signal.

The Master Device 302 can identify the movement to determine the loss, or potential loss of handover functionality. In some embodiments, as part of the communications between the Master Device 302 and the Secondary Devices 304, 306, 308, the Master Device 302 can obtain location information of the Secondary Devices. The Master Device 302 can then use the location information and signal information of the Secondary Devices 304, 306, 308, and terrain information to determine which coverage areas are adjacent and where handovers can occur. If the Master Device 302, determines that two coverage areas are no longer adjacent, the Master Device 302 can communicate the change to the two corresponding MCN communication systems so that handovers are no longer allowed.

In addition, as the Master Device 302 receives location information, if it detects that an MCN communication system has moved, or is moving (e.g., the MCN communication system 308), the Master Device 302 can monitor the movement of the moving MCN communication system 308. Based on the speed of movement and duration, the Master Device 302 can predict when handover operations will no longer be possible between the adjacent coverage areas, and communicate the predicted time and change to the Secondary Devices 304, 306, 308 as part of the NOM data. The MCN communication systems affected by the possible change can then monitor UEs that are in the process of a handover or are getting close to a handover situation. A message to the UEs can be provided regarding the movement of the coverage area/MCN communication system. The message can notify the UE that reception is about to be lost. The message can also provide location information (such as longitude/latitude coordinates, a map, etc.) of other coverage areas in the area where reception can be obtained, or can notify the UE that it is being associated with a different MCN communication system in the area.

Furthermore, UEs that are within the range of the moving coverage area and an adjacent affected coverage area can be identified. The UEs that are detected as moving with the moving MCN communication system can be handed over to the moving MCN communication system (if not already associated with the moving MCN communication system) and the UEs that are detected as not moving can be handed over to the other MCN communication system (if not already associated with the other MCN communication system) as desired.

In some instances, a UE may only be within the range of the moving coverage area, and not move with the moving MCN communication system. In such instances, once the movement of the moving MCN communication system is detected and as the radio signal between the non-moving UE and the moving MCN communication system weakens, the moving MCN communication system can provide location information (e.g., longitude/latitude coordinates, directions, etc.) of another coverage area, such as the next closest coverage area, that is part of the NOM to the non-moving UE. In this way, the non-moving UE can move to another coverage area that is part of the NOM. In some embodiments, the location information can be in the form of a map showing the coverage of the NOM so that the user of the UE can select where they should go to receive coverage.

In some embodiments, the moving/non-moving UEs can be identified by detecting radio signal strength between the UE and the moving MCN communication system. If, for example, during movement of the moving MCN communication system, the radio signal strength between the UE and the moving MCN communication system weakens beyond a threshold level, the UE can be handed over to another MCN communication system (if it is not already associated with the other MCN communication system). If the radio signal strength between the UE and the moving MCN communication system remains approximately the same, the UE can be handed over to the moving MCN communication system (if it is not already associated with the moving MCN communication system).

In certain embodiments, the moving/non-moving UEs can be identified as moving or not based on location information, such as GPS or other location identification technology. If the UEs are moving in approximately the same direction and approximate speed as the moving MCN communication system, the UEs can be handed over to the moving MCN communication system (if it is not already associated with the moving MCN communication system). If the UEs are not moving in the same approximate direction and approximate speed as the moving MCN communication system, the UEs can be handed over to another MCN communication system (if it is not already associated with the other MCN communication system).

In addition, while the MCN communication system is moving, the UEs associated with the moving MCN communication system can be locked in or protected as part of the moving MCN communication system, regardless of whether additional coverage areas are passed or the UEs have a stronger signal quality or strength with another MCN communication system. For example, if moving MCN communication system 308 moved through coverage area 312 and coverage area 314, the UEs associated with MCN communication system 308 would not be handed over to MCN communication systems 302, 304, even if the signal quality or strength with the MCN communication systems 302, 304 is better than the signal quality with MCN communication systems 308.

Figure 5:
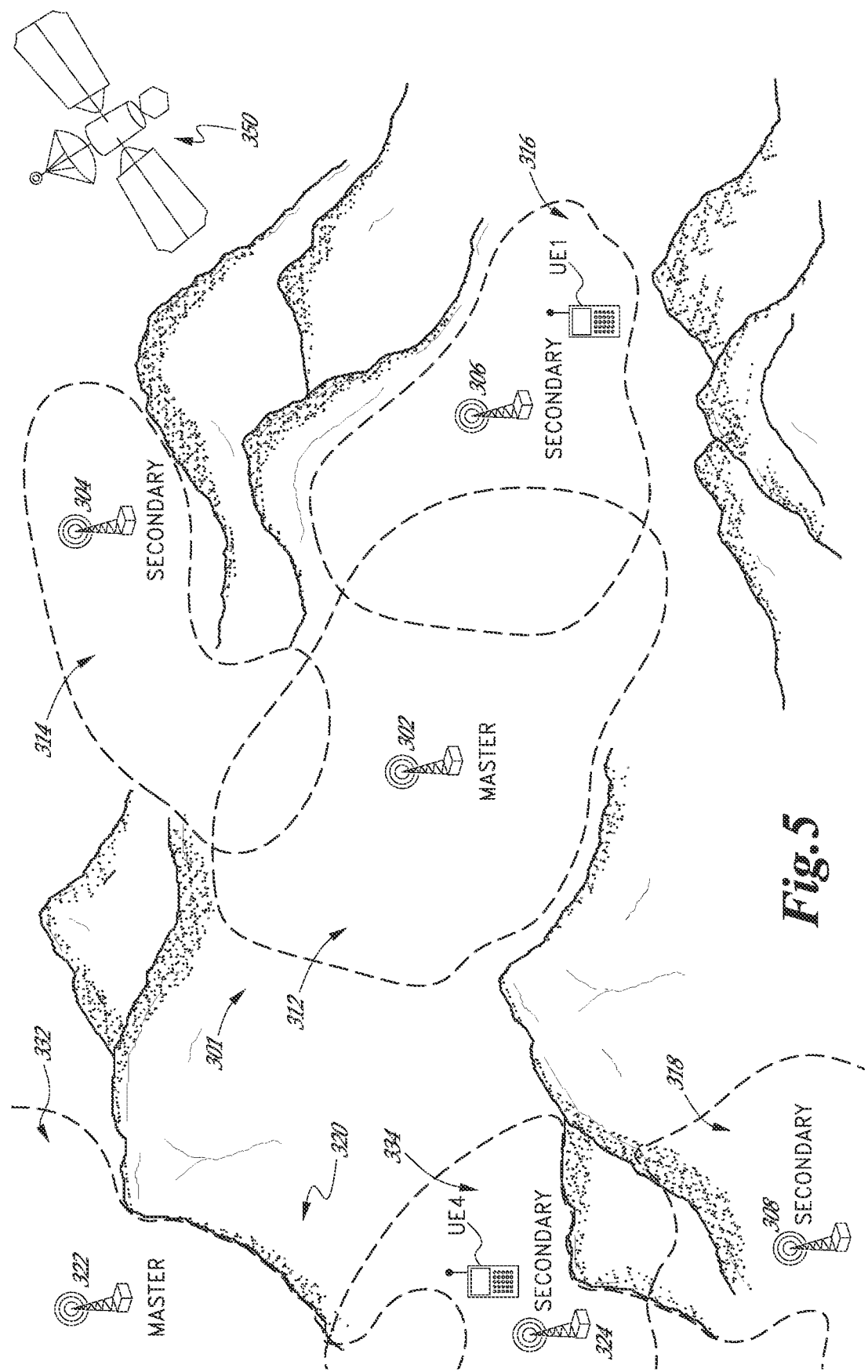

FIG. 5 is a diagram of an embodiment of the NOMs 301, 320 where the Secondary Device 308 has moved farther away from the MCN communication systems in the NOM 301, and is now adjacent to the Secondary Device 324 of NOM 320. As discussed in greater detail above, despite the movement and distance between the coverage area 318 and the rest of the NOM 301, the UEs within the coverage area 318 can still communicate with UEs in the rest of the NOM 301.

In some embodiments, the Master Device 302 includes the location information of the Master Device 322 and the NOM 320. Using the location information, radio strength information, and terrain information, the Master Device 302 can determine whether the coverage area 318 is adjacent to an coverage area of the NOM 320. If the Master Device 302 determines that the coverage area 318 is adjacent to an coverage area of the NOM 320, the Master Device 302 can provide the Master Device 322 with information regarding the Secondary Device 308. The information can include location information, UE information, and communication information to allow the Master Device 322 to communicate with the Secondary Device 308.

In some embodiments, the Master Device 322 can share the NOM data of the NOM 320 with the Secondary Device 308 and the Secondary Device 308 can share its UE information with the Master Device 322, thereby allowing UEs within the NOM 320 to communicate with the UEs in the coverage area 318. In addition, the Master Device 322 can allow handover operations between the coverage area 318 and any coverage areas adjacent to the coverage area 318 (e.g., the coverage area 334).

In some embodiments, the sharing of NOM data with the Secondary Device is temporary. In certain embodiments, the sharing of the NOM data is permanent and the Secondary Device 308 becomes a part of the NOM 320. In some embodiments, the Secondary Device 308 can be part of both NOMs 301, 320 as long as the Secondary Device is adjacent to the NOM 320. Once the Secondary Device 308 is no longer adjacent to the NOM 320, it can be removed from the NOM 320. In certain embodiments, the Secondary Device 308 can be part of both NOMs 301, 320 indefinitely. In some embodiments, once the Secondary Device 308 becomes part of the NOM 320, it is no longer a part of the NOM 301. In such an embodiment, the NOM 301 can remove NOM data related to the Secondary Device 308.

Master Device Change in a NOM

Figure 6:
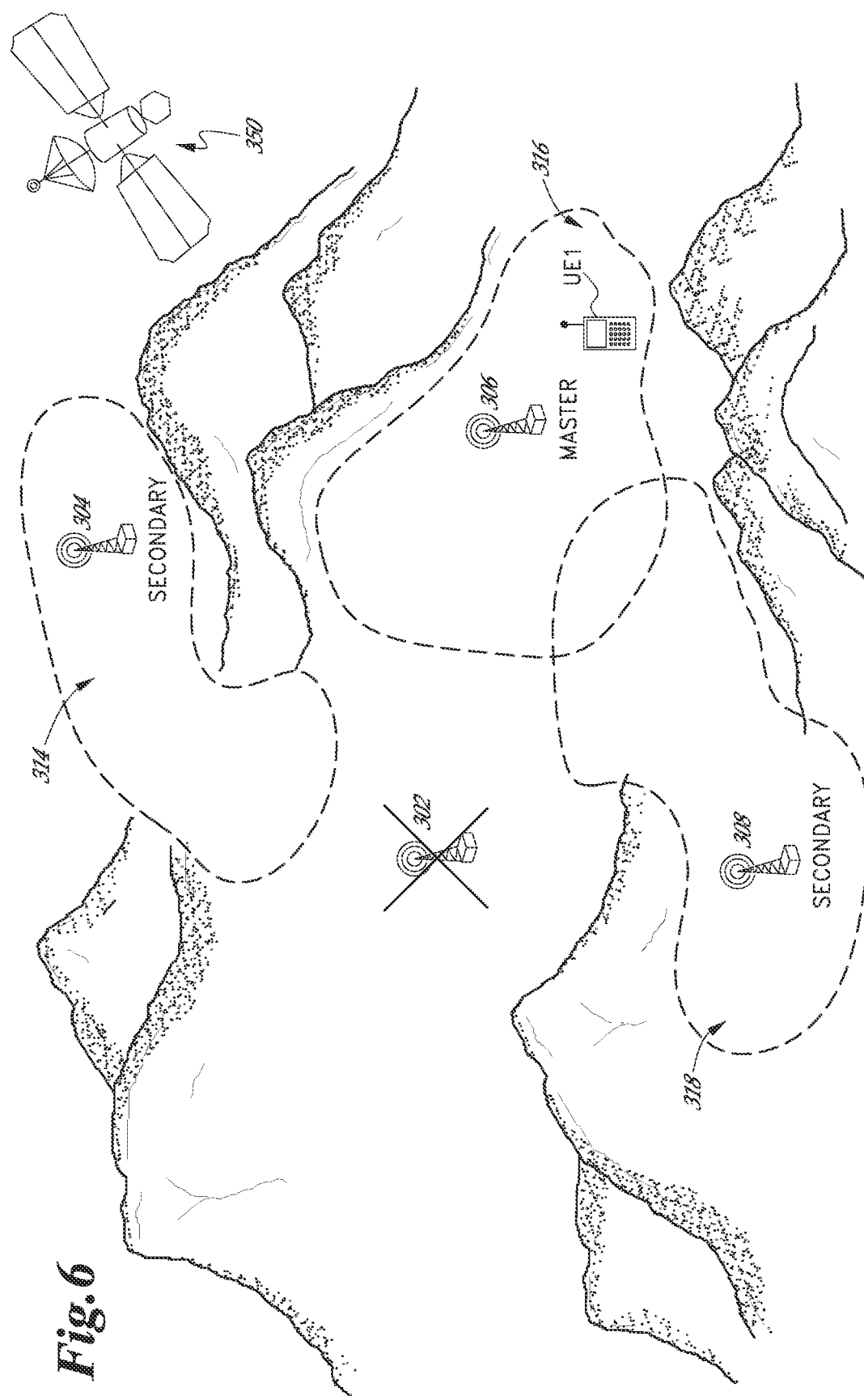
FIG. 6 is a diagram of an embodiment of a NOM in a region.

FIG. 6 is a diagram of an embodiment of the NOM 301 where the Master Device 302 is no longer functional or no longer a part of the NOM 301. During operation, the Master Device 302 and Secondary Devices 304, 306, 308 can communicate at regular intervals and/or at frequent intervals. In some embodiments, if one or more of the Secondary Devices (e.g., the Secondary Device 306) does not receive a communication from the Master Device 302 for a threshold period of time, the Secondary Device 306 can query the Master Device 302 to ensure the Master Device 302 is functioning properly. If the Secondary Device 304, 306, 308 does not receive a response from the Master Device 302, it can communicate with the other Secondary Devices 304, 308. If the Secondary Device 306 cannot establish communication with the other Secondary Device 304, 308, it can change to an independent mode and operate without being part of a NOM.

However, if the Secondary Device 306 is able to establish communication with one or more of the other Secondary Devices, a new Master Device can be selected from among the Secondary Devices 304, 306, 308. In addition, the Secondary Devices 304, 306, 308 can record the last known location of the old Master Device 302 for further reference. In this manner, one or more parties can conduct an investigation to determine what happened to the Master Device 302.

The new Master Device can be selected using one or more parameters, similar to the parameter used to select the first Master Device, described in greater detail above with reference to FIG. 2, and/or other parameters. For example, the new Master Device can be automatically selected based on location information. In some instances, it may be beneficial to select the Secondary Device furthest from the Master Device as the new Master Device when the NOM is in a battlefield location because the Master Device may have been destroyed and the MCN communication system furthest from the destroyed Master Device may be the safest MCN communication system. Accordingly, the Secondary Device farthest from the Master Device can be selected as the new Master Device. Alternatively, in some instances, personnel operating the Master Device may be able to more easily reach the MCN communication system that is closest to the old Master Device. Accordingly, the Secondary Device nearest the old Master Device can be selected as the new Master Device.

The new Master Device can also be automatically selected based on its age or version number. For example, a newer MCN communication system may be preferred over an older MCN communication system due to improvements in technology, etc. Alternatively, older MCN communication system may be selected because it has been proven to work over time. In some embodiments, MCN communication system with a certain version or revision number can be selected. The version or revision number can correspond to an updated version or version that includes an important update or function.

Similar to the detection of a malfunctioning Master Device, malfunctioning Secondary Devices can be detected. For example, if a Master Device has not received any communication from a Secondary Device within a threshold period, the Master Device can query the Secondary Device. If the Master Device does not receive a response, the Master Device can log the last known location of the Secondary Device and update the NOM data to remove references to the UEs in the coverage area corresponding to the Secondary Device and other related data. Any other Secondary Devices can receive the updated NOM data from the Master.

Network Management Control Center

Figure 7:
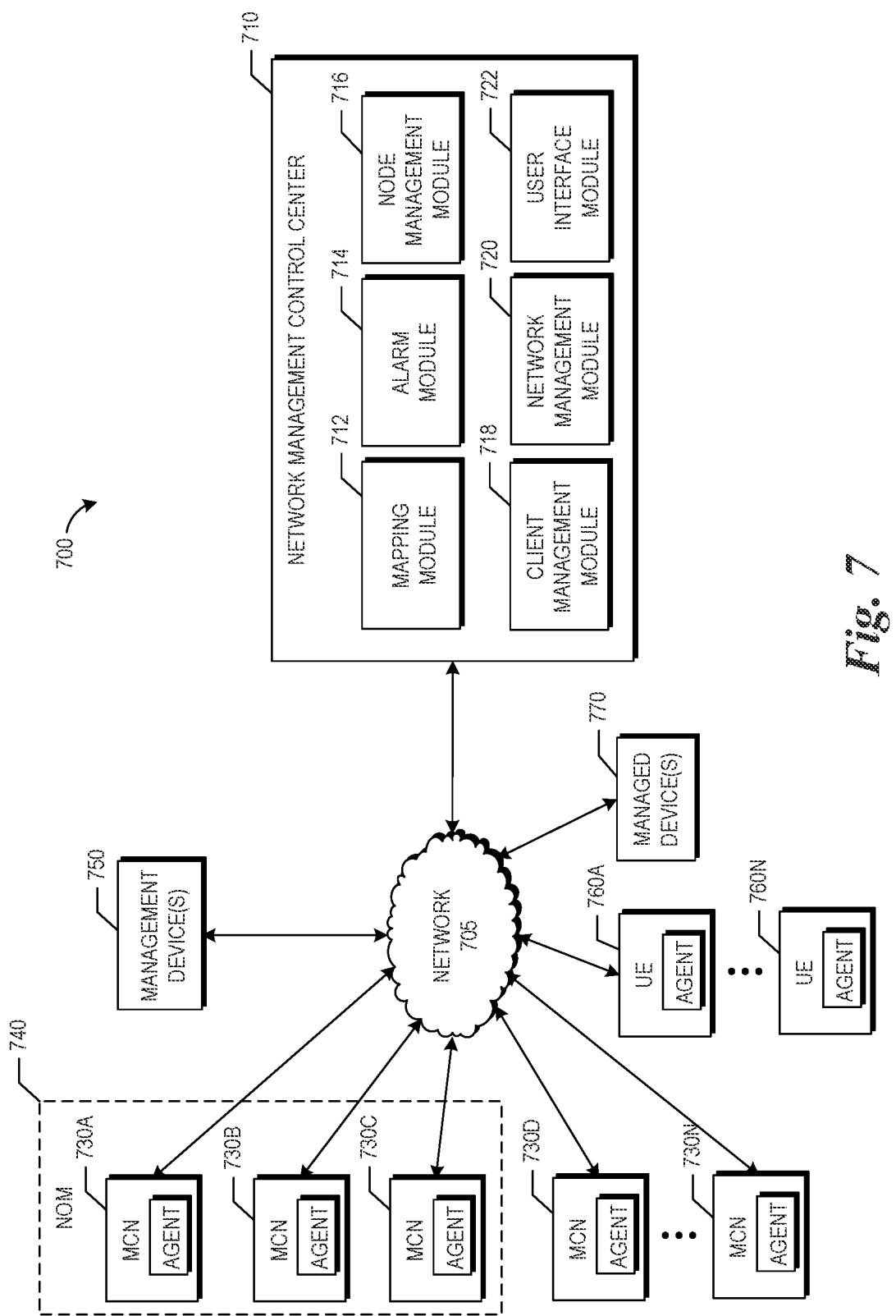
FIG. 7 is an illustrative operating environment for a Network Management Control Center (NMCC).

FIG. 7 illustrates an embodiment of an operating environment 700 for a Network Management Control Center (NMCC) 710. Among other features, the NMCC 710 can provide a network management platform for NOMs and a plurality of MCN communication systems 730.

In the operating environment 700, one or more MCN communication systems 730 communicate with the NMCC 710 over a network 705. The MCN communication systems 730 can be organized into one or more networks, or NOMs, 740 as discussed above. The MCN communication systems 730 can also be configured as a stand-alone network device. The NMCC 710 can manage a plurality of NOMs 740 and MCN communication systems 730. The NMCC can also manage the network, subscribers, UE devices 760, error management, and other network functionality.

In this embodiment of the operating environment 700, there is a NOM 740, and a plurality of MCN communication systems 730D-N. The NOM 740 has three MCN communication systems, a master device 730A, and two secondary devices 730B-C. The additional information regarding the MCN communication systems 730 is discussed above.

Each MCN communication system 730 can have an agent that communicates with the NMCC 710. Each agent communicates information to the NMCC 710 independent of other network communication activities performed by the MCN communication systems 730, including information communicated between master and secondary devices within a NOM. As such the NMCC 710 can independently monitor and communicate with each MCN communication system 730 regardless of whether it is a master or secondary device. The MCN communication systems 730 can provide information to the NMCC 710 such as, network conditions, subscriber information, positioning information, and the like.

The NMCC 710 can communicate with one or more UE 760. The UE 760 can have agents that communicate directly with the NMCC 710. The agent can provide information about the UE 760 to the NMCC through the network. The NMCC 710 can manage the UE 760 with the client management module 718. The NMCC 710 can also communicate with a plurality of managed devices 770. The managed devices 770 can include other network devices such as routers, switches, simple network management protocol (SNMP) capable devices, and other network capable devices.

NMCC 710 can be implemented by one or more physical computing devices, such as servers. These servers can be physically co-located or can be geographically separate, for example, in different data centers. The NMCC 710 can run on servers or systems separate from NOM and MCN systems that the NMCC 710 is configured to manage. The illustrated network 705 may be a LAN, a WAN, the Internet, a NOM, an MCN, combinations of the same, or the like. In some embodiments, the NMCC 710 can run locally on an MCN communication system 730.

In the depicted embodiment, the NMCC 710 includes a map service module 712, an alarm management module 714, a node management module 716, a client management module 718, a network management module 720, and a user interface module 720. The user interface module 720 can provide an interface for management devices 750 to connect to the NMCC 710 over the network 705. Embodiments of user interfaces for the NMCC 710 are shown in FIGS. 8 through 14.

Management devices 750 can communicate with the NMCC 710 over the network 705. The management devices 750 can be computing devices used by, engineers, and personnel responsible for managing the NMCC 710. The NMCC 710 can have web-based access through a management device 750. In some embodiments, users can access the NMCC 710 from a dedicated operation and maintenance network. The NMCC users may or may not be subscribers of an MCN 730 or NOM 740. The NMCC 710 can have account based access, where the information that a user can access on the NMCC is determined by account privileges.

Map Service Module

The map service module or mapping module 712 provides real-time, or substantially real-time, mapping functionality for the NMCC 710. The map service module 712 can display mapping of the region where the MCN communication systems 730 are geographically positioned. For example, the mapping module 712 can display street maps, satellite maps, terrain maps, topographical maps, or other maps provided by a mapping service (e.g., Google® maps). The mapping module 712 can be configured to display additional information in real-time or substantially real-time, such as weather, traffic, or other information.

Figure 8:
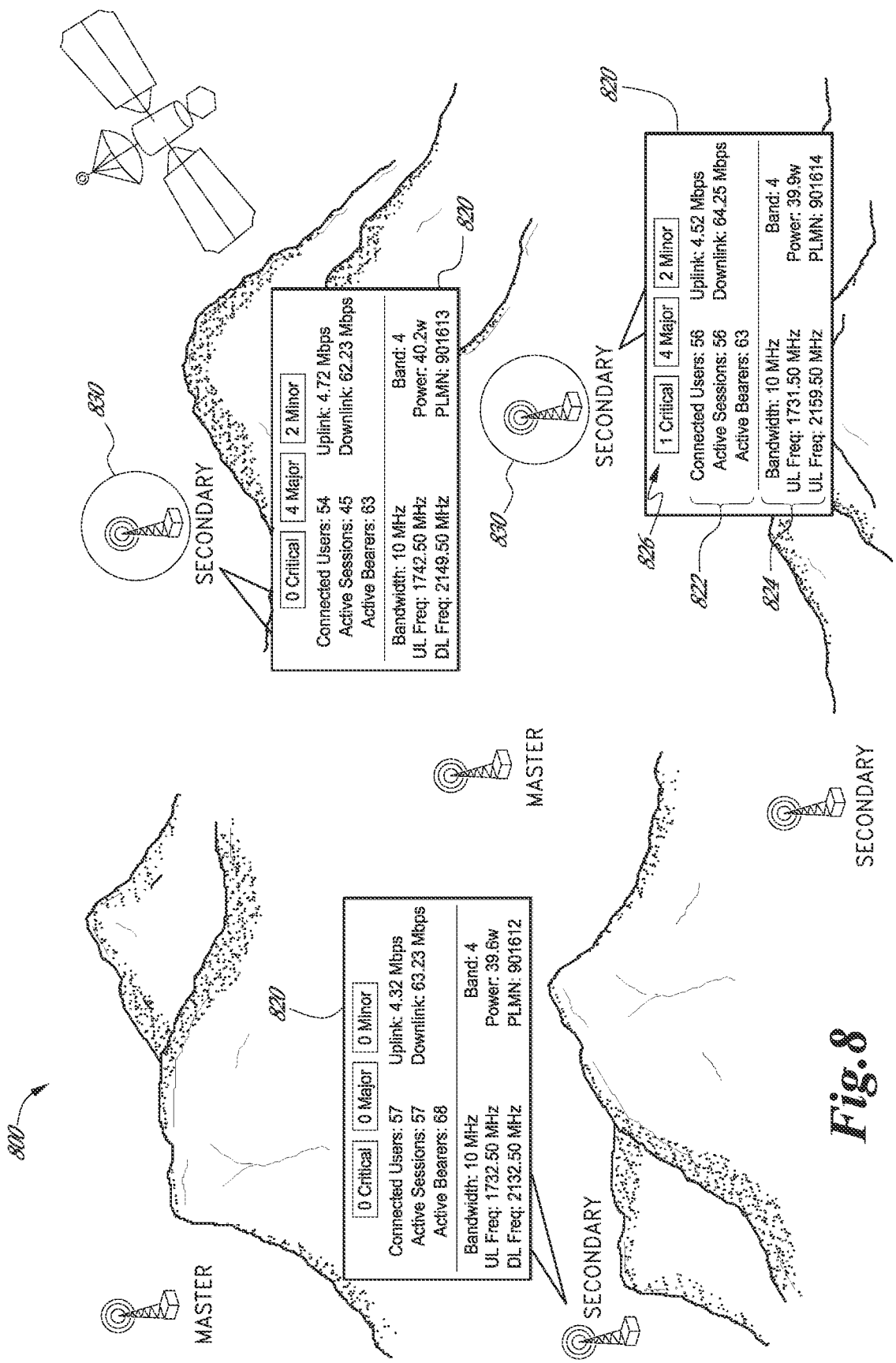
FIG. 8 is a diagram of an embodiment of NOMs in a region.

The mapping module 712 can further be configured to show the location of each MCN communication system 730. An embodiment of a map showing the location of MCN communication systems 730 within a geographic area is shown in FIG. 8. The location of the MCN communication system 730 can be based on GPS data, or other network type data that is communicated from the MCN communication system 730 to the NMCC 710. The information in the maps can be filtered by the user to show a subset of the total number of MCN communication systems 730 available.

FIG. 8 illustrates an example of a user interface 800 generated by the mapping module 712. The user interface displays the locations of a plurality of MCN communication systems 730. The mapping module 712 can be configured to display general information about each MCN communication system 730 on the mapping screen 800. The information can be displayed in a popup box 820. The popup box 820 may be activated by a user selecting or clicking on the MCN communication system 730. The popup box 820 can provide information about the MCN communication system 730 when activated. The popup box 820 can display, among other things, subscriber information 822, MCN configuration information 824, and alarm information 826. The subscriber information 822 can include the number of connected subscribers or users, the number of active sessions, the number of active bearers, the uplink throughput, the downlink throughput, and the like. The configuration information can include the bandwidth, the uplink frequency, the downlink frequency, the band, power consumption, PLMN, and the like. The alarm information 826 can include the alarm type, number of alarms, and the like. The user can select the alarm information to be redirected to an alarm user interface, such as the one described in association with FIGS. 11A-C. Additionally the MCN communication system 730 can have an indicator 830, which indicates that the MCN communication system 730 has one or more errors. The indicator 830 can be displayed in different colors to indicate the severity of the error. For example the indicator 830 can be red to indicate at least one critical error.

The mapping module 712 can also be configured to display the location of each client or UE device subscribing to an MCN communication system 730. The location of the UE can be based on GPS data, or other network type data that is communicated from the UE to the MCN communication system 730. The MCN communication systems 730 can communicate the location of the UEs to the NMCC 710. In some embodiments, the UE can have an agent that communicates directly with the NMCC 710. The mapping module 712 can filter the display parameters be configured to display the location of the UEs, by MCN, by NOM, or by other display parameters determined by the NMCC and/or a user.

The MCN communication system 730 can provide location information at regular intervals to the NMCC 710. The MCN communication systems 730 can also provide the location of UEs. For example, the NMCC 710 may receive an updated position for an MCN communication systems 730 every 100 milliseconds, every second, every 5 seconds, every minute, every 5 minutes, or other suitable timeframe, which can be specified by system, user, and/or other constraints or preferences. The position of each UE can be updated independently of the position of the MCN communication system 730. The timeframe of the UE updates can have similar constraints and/or preferences that dictate the frequency of the updates. To reduce the use of bandwidth on the network, the frequency for updating the position of the MCN communication system 730 and UE may be reduced. In one embodiment, the position of the MCN communication system 730 and the UE is sent to the NMCC when movement is detected. For instance, when the position of the MCN communication system 730 or UE moves, the agent can send updated position information to the NMCC 710. In some embodiments, the MCN communication system 730 can provide positioning information to the NMCC 710 at a higher frequency when movement is detected.

Figure 9:
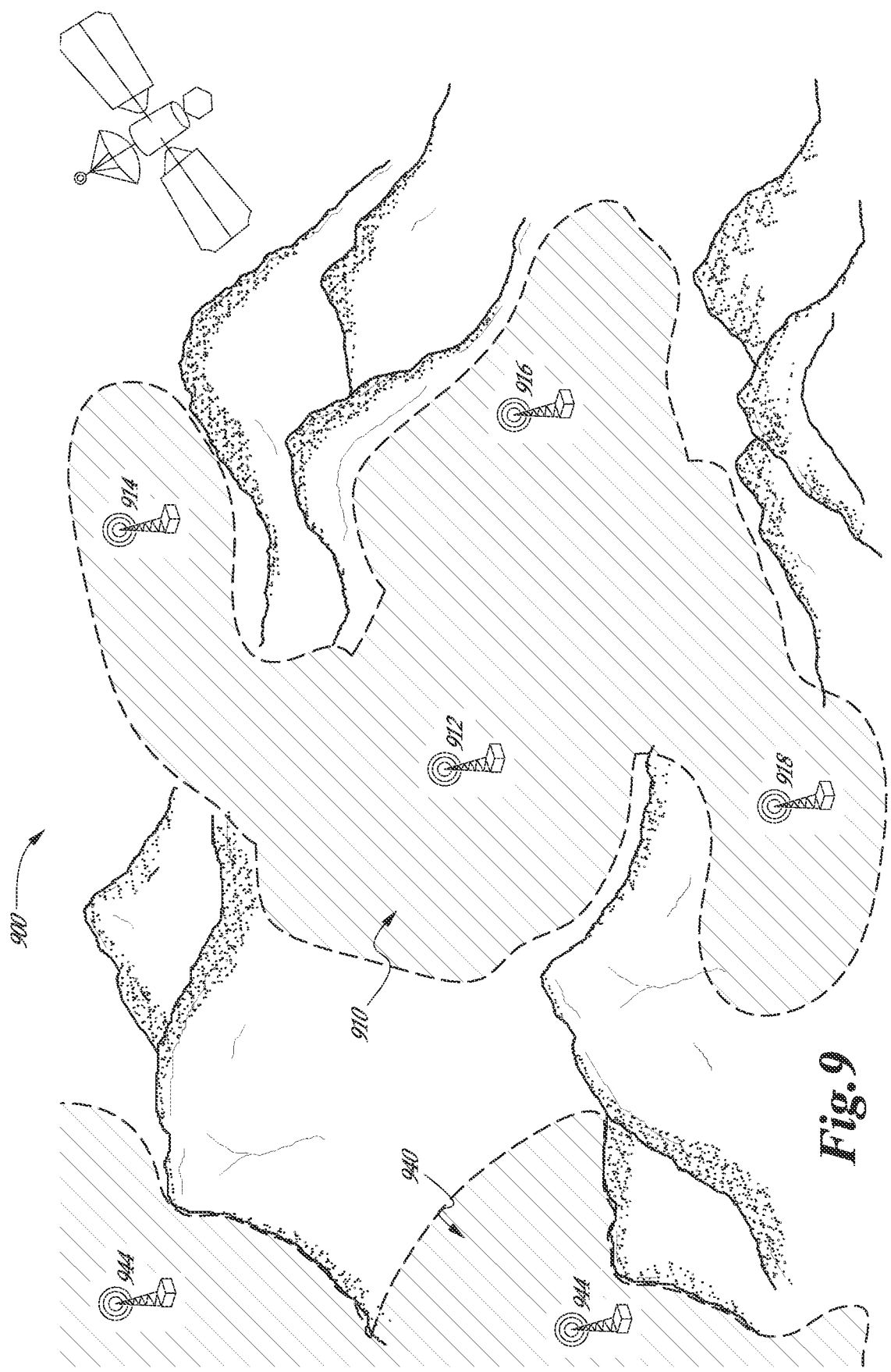

FIG. 9 illustrates an embodiment of a network coverage map 900. The mapping module 712 can provide a coverage map, showing real-time network coverage of an MCN communication system or NOM. The network coverage map displays a first NOM coverage area 910 and a second NOM coverage area 940. The first NOM has four MCN communication systems, a master device 912, and three secondary devices 914, 916, 918. The second NOM has two MCN communication systems, a master device 942, and a secondary device 944. The coverage area for each NOM is illustrated by the crosshatched region circumscribed by a dashed line. In this embodiment the coverage area is displayed as a single unified area. There may be overlap between the coverage area of the master and secondary devices within a NOM, and coverage areas of different NOMs. The coverage area can be configured to display RF uplink coverage, RF downlink coverage, and other network coverage information, such as the signal strength. The coverage map can be configured to have different overlays that show, for example, different coverage types, overlap of networks, and signal strength. The different overlays can have different colors or patterns to help users quickly interpret the coverage map. The coverage map can use different colors to show differences in signal strength.

In some embodiments, a coverage map can be generated for a NOM, and individually for each MCN communication system (master or secondary) within the NOM. The NMCC 710 can then configure the coverage map to display a unified coverage map or view coverage information for each MCN individually. The NMCC can provide the user with filtering options to display the coverage area for a NOM, a group of selected MCN systems, or an individual MCN system. This can help the user to evaluate the coverage and effectiveness of each MCN system.

The coverage map can be generated using network and location information provided by the MCN communication systems 730 and geographical information provided by a mapping service. The network information can be derived from an active MCN communication system 730. The MCN communication system 730 exports the network information to the NMCC 710. The network information that is exported from the MCN communication systems can include radio band, power, antenna configuration, (such as omni or sectorized), antenna height, antenna direction, antenna hardware model, cable RF loss, radio configuration (such as MIMO or SISO), radio hardware type (such as remote radio unit or radio unit), handset type, and other network factors. The GPS location of the MCN communication system and terrain information provided by the mapping service exported to the NMCC in order to calculate the effective coverage area of each MCN system 730. The coverage map can provide an aggregate coverage map one or more NOMs 740 or a plurality of MCN systems 730. The generated coverage map can be overlaid on a display map.

FIG. 10 illustrates an update to the coverage map 900 from FIG. 9. In FIG. 10 the position of the MCN communication system 918 has changed. FIG. 10 shows a first updated coverage area 920 for the primary device 912 and secondary devices 914, 916, and a second updated coverage area 930 for secondary device 918. In some embodiments the mapping module 712 can use color, patterns, or other methods to differentiate between coverage areas on the coverage map.

The coverage map can be updated periodically, manually, and/or dynamically to take into account changes to the coverage map. Changes to the coverage map can arise from changes to the effective coverage area of an MCN system, changes in network conditions, changes in position of an MCN communication system, and/or a combination of these and other conditions. The entire coverage map can be updated or just a portion of the map can be updated.

The coverage map can be updated periodically at a regular frequency such as every second, every 5 seconds, every minute, every 5 minutes, or other timeframe that is specified by the hardware, system, and/or user constraints and preferences. Updates to the coverage map can be initiated when a threshold is satisfied. The coverage map can be updated when the coverage area changes. The mapping module 712 can detect changes to the coverage area by monitoring the network parameters for each MCN system. The mapping module 712 can establish thresholds for the network parameters that could be used to determine whether the coverage area would change. For example, the mapping module 712 may monitor the value for power in each MCN communication system. The power value could have upper and lower thresholds. A threshold could be established that is satisfied if the power value changes by a specific amount or percentage. If the threshold is satisfied or exceeded, the mapping module 712 recalculates the coverage map. The thresholds can be based on one or more network parameters, use an algorithm, or apply another methodology to determine whether the thresholds are satisfied and the coverage map will change.

The network coverage area can also be updated when the MCN communication system changes position. The mapping module 712 can establish thresholds to determine when to update the coverage map based on movement of the MCN communication system. The thresholds can be based on position, speed, acceleration, altitude, time, and/or other parameters. The positioning of the MCN communication system can be determined by GPS data, or other network based positioning data. The movement based thresholds may vary based on the amount and duration of the movement. The magnitude of the movement threshold can increase as the speed of movement of the MCN communication system increases. For example, when the MCN communication system is initially moved from a position, the threshold may be 50 feet. However, when the MCN communication system is moving at 50 miles per hour, the threshold may increase to 500 feet or greater. In some embodiments changes to the position of UE devices can trigger an update to the coverage map.

The movement threshold and the network parameter thresholds may be superseded, or overridden, by time-based, or system level constraints. For example, the mapping module 712 may only be able to update the coverage map every thirty seconds. Or the system may have a requirement that the system only update the coverage map every minute in order conserve bandwidth over the network. These system level requirements can prevent the coverage map from being updated even if a threshold is satisfied.

The mapping module 712 can perform different type of updates to the coverage map. The mapping module 712 can perform partial or full updates of the network coverage area. By updating only a portion of the map, bandwidth and system resources can be conserved. FIG. 10 illustrates a change in coverage caused by the movement of the MCN communication system 918. The MCN communication system 918 moved from a first position in FIG. 9 to a second position in FIG. 10. The other MCN communication systems remained stationary. In some embodiments the mapping module 712 can monitor the position of each MCN communication systems and update the coverage area of a single MCN system 730. In some embodiments, the mapping module 712 updates the entire coverage area if any thresholds are satisfied by any MCN system 730.

In some embodiments, the mapping module 712 can be used to predict coverage area based upon network parameters and the geographic terrain information. During a calculation of the coverage map, the coverage map can take into account the current positional information of the MCN system 730 in addition to derived information such as velocity and acceleration. Based upon the velocity and acceleration information the mapping module 712 can calculate a predicted position of the MCN communication system 730. The predicted position can also take into account the frequency of the updates to the coverage area. As the length of time increases between updates, the value and relevance of the coverage map can decrease, especially for a fast moving MCN communication system. The frequency of updates for an MCN communication system traveling at 60 miles per hour can be greater than the frequency of updates for an MCN communication system traveling at 5 miles per hour.

Predictive coverage mapping can be helpful when determining coverage area for an aerial based MCN, such as the MCN communication system 208 coupled to the drone 220 in FIG. 2. In some embodiments the mapping module 712 can create a predicted coverage area for aerial coverage based on an anticipated flight path. For example a drone may have a flight path that continually circles a specific region. The region can have a core coverage area expected to always have coverage and periphery areas that have coverage depending on the exact position of the MCN communication system 730.

In some embodiments, the mapping module 712 can provide virtual positioning capabilities to a user of the NMCC. The user can virtually position an MCN within the user interface of the NMCC to create a predictive network. The mapping module 712 can use the network parameters of the MCN system 730 and the geographical data to predict coverage for the virtual position of the MCN communication system 730. A virtual network can be helpful for positioning and properly allocating the MCN communication systems 730.

In another embodiment, the NMCC 710 can detect interference and jamming of frequencies in the network. The interference information can be communicated to the mapping module 712. The mapping module 712 can process the information and adjust the coverage map, to display the regions on the coverage map where interference is detected. The mapping module 712 can adjust the coverage map to show where the interference can have adverse effects on the coverage area.

In an embodiment, the coverage map is accessible by the UE devices. The UE devices can download and display the coverage maps in order to determine where and when to expect cellular coverage.

Alarm Management Module

The alarm management module or alarm module 714 provides aggregated error reporting for the NMCC 710. The alarm management module 714 receives alarm information from each of the MCN system 730 individually. The agent for each MCN system 730 provides the alarm management module 714 with information relating to any alarms. The alarm module can aggregate alarm data from any number of MCN systems 730. The alarm module 714 aggregates all the information from each MCN system 730 into the NMCC 710.

FIGS. 11A through 11D illustrate an embodiment of an alarm management user interface 1100 for the alarm module 714. The alarm management UI 1100 includes, among other things, a sidebar 1110, an alarm display 1130, a navigation bar 1140, search bars 1144, 1146, and account information 1150. The sidebar 1110 provides a plurality of filtering options.

The navigation bar 1140 has a plurality of navigation tabs or buttons that can be used to navigate between different user interface screens. In this embodiment the navigation bar has tabs for maps, alarms, nodes, clients, and config. The tabs can include message indicators 1142 that provide the user with additional information or messages relating to the specific interface. For example the indicators 1142 indicate that there are alarms on the alarm screen. The user interface can also have search bars 1144, 1146 that provide searching functionality to the user. In this embodiment, the search bar 1144 provides search functionality relating to help topics for operation of the NMCC interface. The search bar 1146 provides search functionality relating to alarms. The navigation bar can provide system information 1148, such as date and time.

The user interface 1100 can provide access to account information 1150. The account information can provide additional information to the user regarding account options, privileges, preferences, and settings. The user account can also determine the access that the user has within the NMCC. The user account determines the MCN communication systems that the user can access.

The alarm display 1130 provides alarm data to the user about each alarm. When an alarm is triggered, the alarm is displayed in the alarm display 1130. Each alarm is associated with a single MCN system. Each alarm and associated alarm data can be viewed in the alarm display. Each alarm has associated alarm data that provides information about each alarm. Alarms from each MCN system are aggregated and can be displayed in one more locations on the user interface. When an alarm occurs, it can be displayed in one more locations on the user interface 1100. In this embodiment of the user interface 1100, an alarm can be displayed on the map interface 800, as illustrated in FIG. 8, the alarm display 1130, and the navigation bar 1142. The alarm display 1130 can have a live alarm feed that displays all alarms that occur as they happen.

The alarm display 1130 has a plurality of columns and a plurality of rows configured to display the alarm and alarm data. The alarm data can include alarm severity, cause, alarm detail or type, node, time of occurrence, and the like. The first row is a header row 1132 that displays the different types of alarm data that are displayed in each column. The subsequent rows 1134 display alarms. The user can configure the data to be displayed in each column. Each column can have sorting functionality that allows the user to sort the alarm rows 1134 according to a specific alarm data type. For example the alarm rows 1134 can be sorted by alarm severity, time, or other criteria. The user can also flag or mark errors for later review.

In addition to sorting, the alarms can be filtered according to the filtering options listed in the sidebar 1110, including alarm type/severity 1112, node 1114, client 1120, time range 1122, and other filtering options. A user can select one or more of the sidebar filtering options to narrow and refine the alarm display 1130. Alarms that meet the filter criteria are displayed within the alarm display 1130. The alarm types filter 1112 can filter the alarms according to severity of the alarm. The node filters have NOM filters 1116 and MCN filters 1118. The alarm module 714 receives data from every MCN on an account. By default alarm data from every MCN system is displayed within the alarm display 1130. This can include multiple NOMs and stand-alone MCN systems. The filters allow a user to view alarms associated with each MCN system individually. The user can also view errors associated with each MCN system within a NOM. The user can view data from more than one NOM simultaneously. The user may view errors associated with UE subscribers for within each NOM or MCN.

The alarms can be displayed according to time range 1122. The time ranges can include alarms generated in the past 24 hours, the past 1 hour, the past 15 minutes, or other appropriate time frame. The MCN communication systems 730 generates log files which can be displayed on the alarm module interface. The alarm module 714 can be filter and display log files 1124 associated with each MCN. The log files can be displayed based on error types, MCN, NOM, and other filtering options.

Figure 11A:
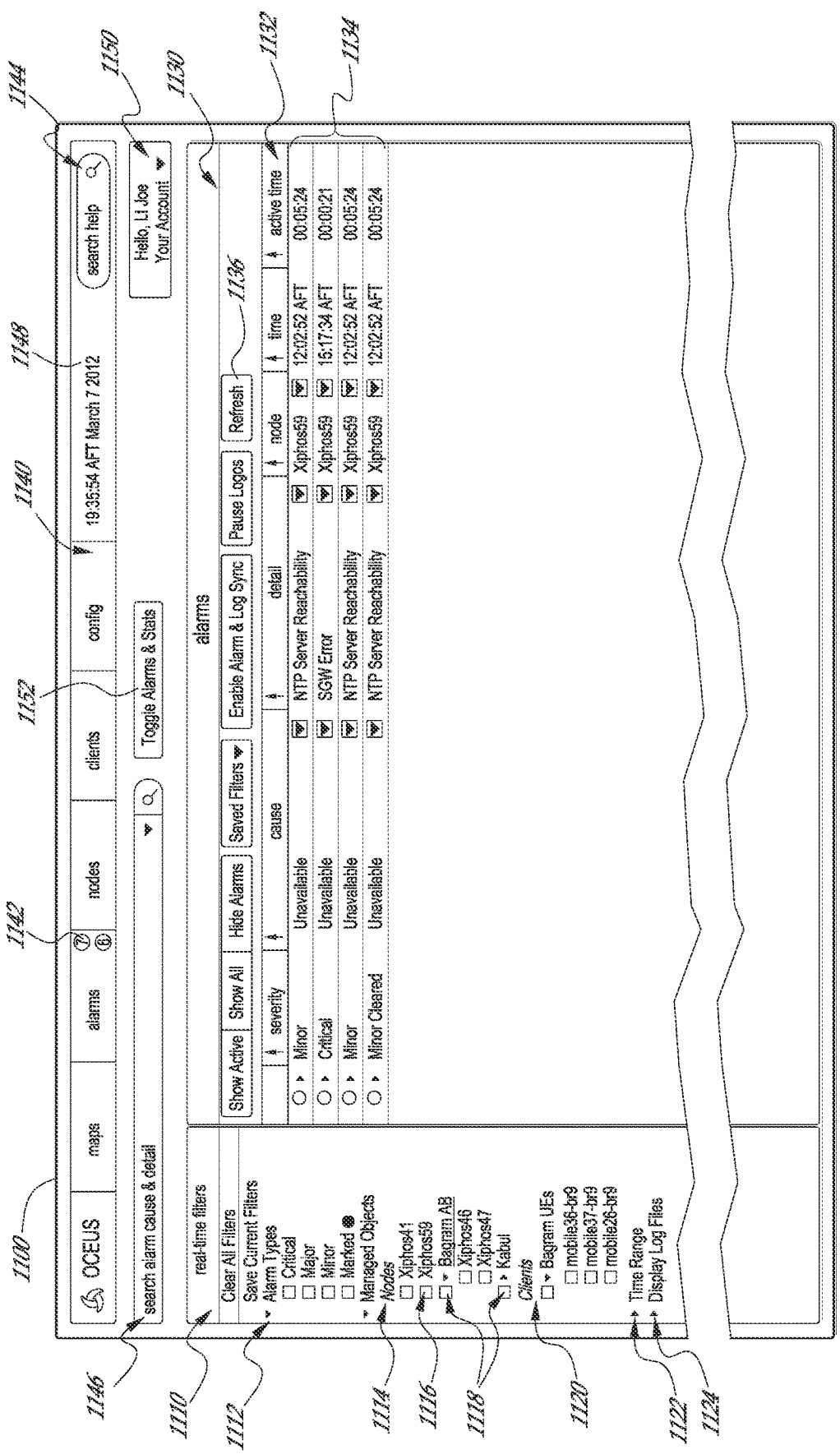
Figure 11B:
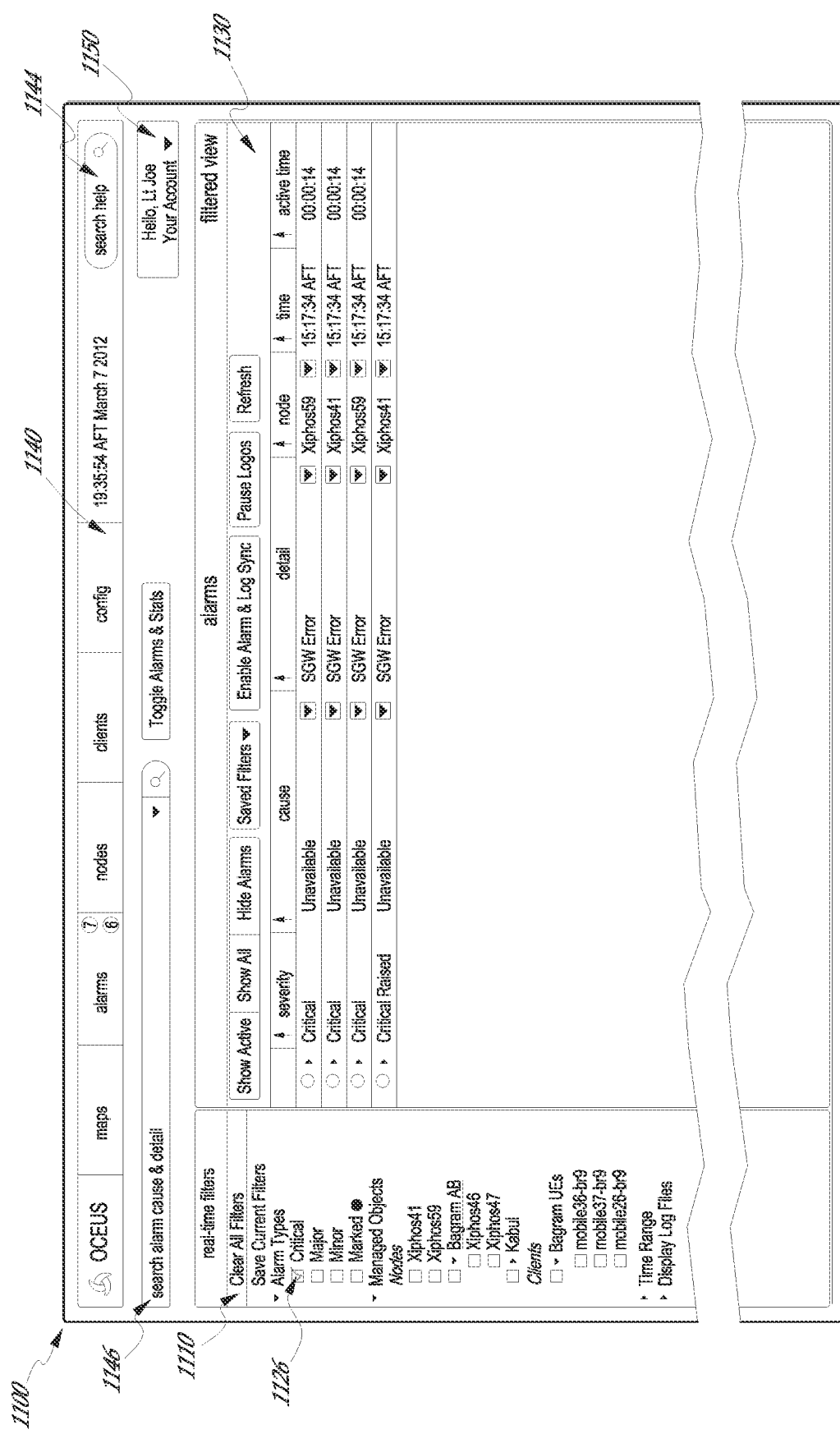

FIG. 11B illustrates a filter being applied to the alarm display. The critical alarm type is selected as illustrated by the checkmark 1126. Only alarms with critical severity are displayed within the alarm display 1130. Additional options can be selected in order to further refine the alarm display 1130. Specific filtering templates can be created that can be applied at a later time without individually selecting the filter options. Filtering templates can increase efficiency and be helpful in quickly refining and analyzing alarms.

Figure 11C:
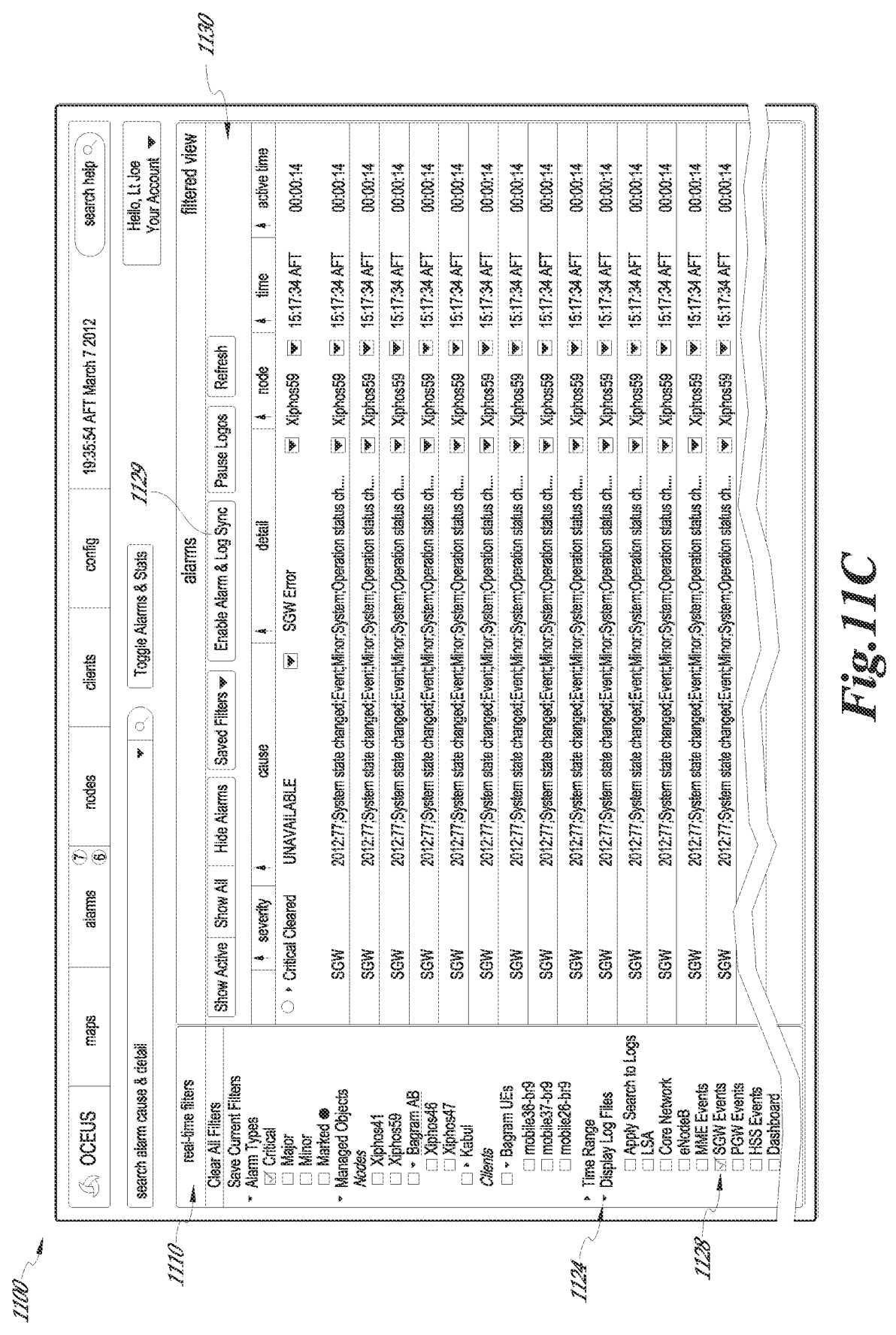

FIG. 11C illustrates the display of log files on the alarm screen. The alarm display 1130 can be configured to show log files generated by the devices managed by the NMCC 710, including MCN communication systems 730, UE 760, and managed devices 770. The display can show the log files corresponding to alarms in real-time. Real-time filters allow the various alarms to be quickly narrowed down to a desired set of alarms of interest. This can include, for example, a single alarm or a subset of alarms based on alarm type, managed object, time, or other selected or desired criteria. The available log file filters 1124 provide a quick and easy real-time system for filtering alarms to the subset of desired alarms. In some embodiments, the log file filters 1124 are hidden until a managed MCN communication system is selected. When an MCN communication system is selected, only log files relevant to the selected MCN are displayed. In some embodiments, log file filters that are relevant to the selected MCN communication system are displayed and irrelevant log file filters can be grayed out or removed from the user's view.

When an alarm is selected the log files for the selected alarm can be displayed on the same screen as the alarm. The log files can be filtered according to time, type, managed object and/or any other parameters. The alarm module can automatically filter and process the log file entries so that each log file entry is populated on the alarm display 1130. A user can select multiple log files to view log entries for multiple logs. The filtering can happen in real-time, or substantially real-time. When one of the various log file filters are selected, the view 1130 changes substantially instantaneously with little processing involved. Moreover, as new alarms are received, they are automatically categorized and added to the view 1130 instantly if they form part of the selected group of alarms. Thus, there is no need for the computer system to reprocesses information every time a new filter is selected.

The log files can be sorted and filtered by log type, time, or another option. When filtering by time, new log data will push the older log data down as it becomes available. A user can have the option to freeze the display so that new alarm data does not affect the positioning of the alarm data. The alarm module can synchronize the log files with the alarm files into a single user interface. In some embodiments, the user interface will have a button 1129 that synchronizes the alarm file data and the log file data so that the user can see log file entries and data that precede the alarm. By integrating and synchronizing log data and alarm data into a single interface, the user can analyze and troubleshoot alarms quickly and efficiently. Moreover, by pre-categorizing the alarms and log files, real time filtering of the alarms with minimal processing requirements can be achieved.

In FIG. 11C the log file entries for SGW events has been selected, as illustrated by the checkmark 1128. The SGW event log files are being displayed in the alarm display 1130 under the selected alarm. The log file data is processed and filtered in real time so that the user can view all log events that preceded the selected alarm on the same screen as the alarm.

Figure 11D:
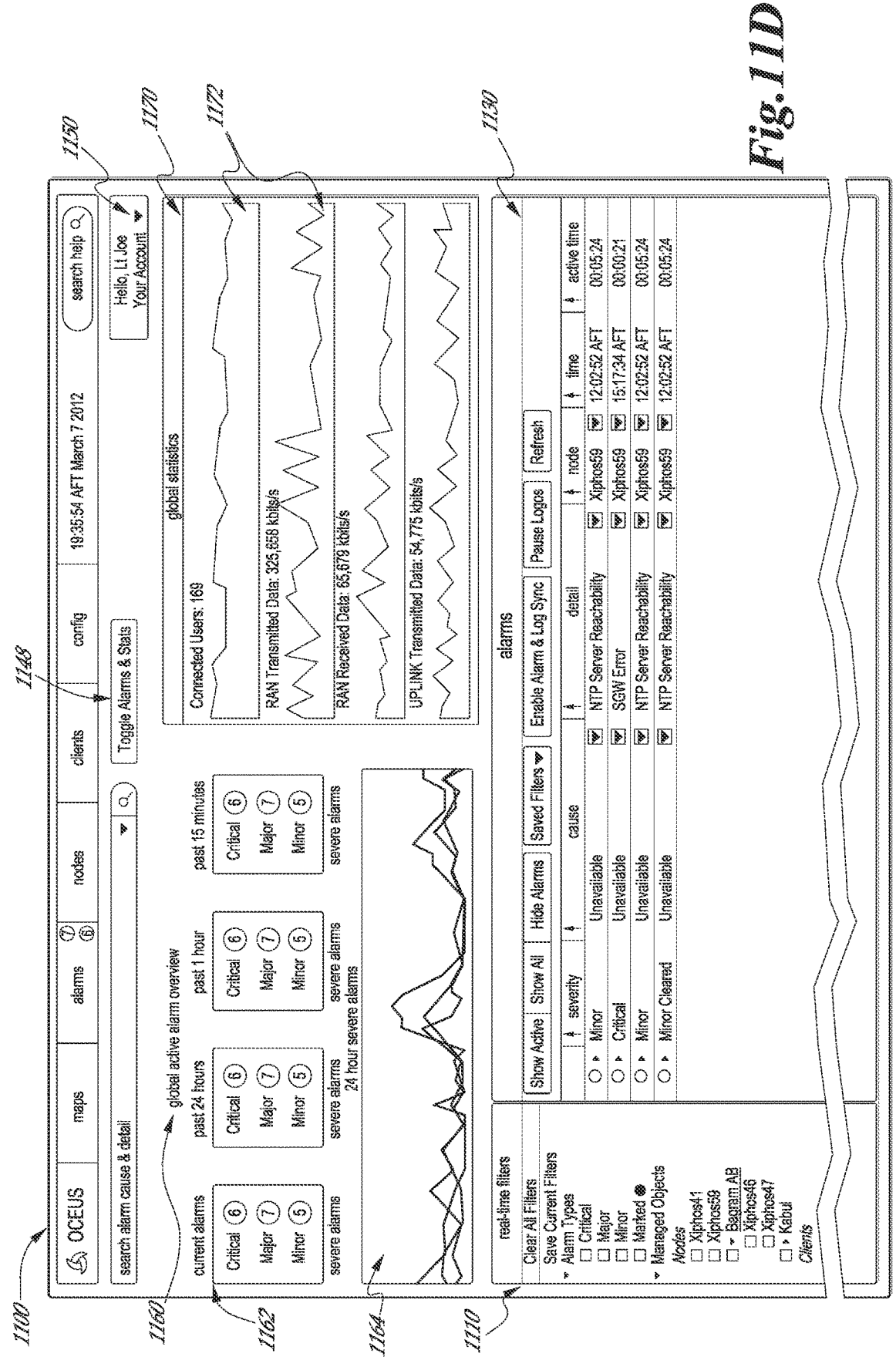

FIG. 11D illustrates additional information that can be provided to the user. The information displayed in FIG. 11D can be toggled by pressing the button 1148. The alarm module can provide a global alarm overview 1160, including trend graphs 1164 and charts 1162 displaying the number and severity of alarms. In this example, alarm data is shown for the current time, the past 15 minutes, the past hour, and the past 24 hours for all MCN on the account. On the opposite side of the user interface network statistics for the account are displayed 1170. The network statistics can include a plurality of plots 1172, such as connected users, RAN transmitted data, RAN received data, Uplink transmitted data, and the like.

Figure 12:
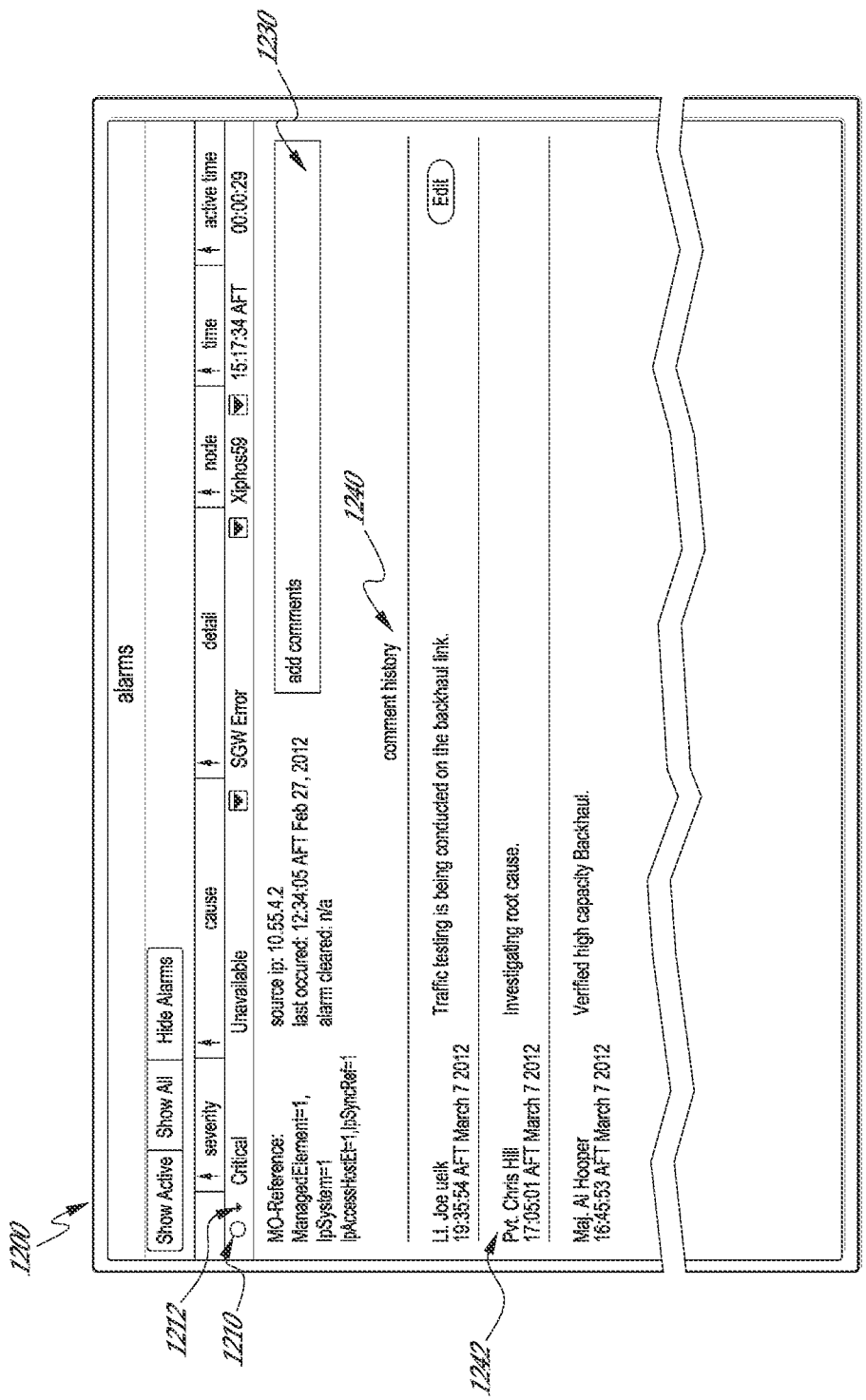
FIG. 12 is an illustrative embodiment of an alarm window user interface for an NMCC.

In addition to the display of the alarm data to the user, the NMCC can be used to clear and manage alarms. FIG. 12 shows an embodiment of a user interface window 1200 showing an alarm management interface. The user interface window 1200 can be displayed by selecting the alarm in the alarm display 1130. In one embodiment, the additional alarm information can be displayed by selecting the triangle 1212 and can be hidden by selecting the triangle 1212 again. The alarm 1210 is displayed along the upper part of the window 1200. The alarm module can provides additional information 1220 such as the when the alarm last occurred, the source IP, and whether the alarm has been cleared. The alarm display also provides a platform for users to comment 1230 on the status of the alarm and provide information to other users. The comments can be saved within the alarm data in the comment history section 1240. Each comment has commenter identifying information 1242, which can include the user and time, and the comments. The alarm management interface allows users in separate locations to keep track of status and progress on each alarm, which can help coordinate efforts between multiple users. The alarm module 714 can also provide additional information about the operational status of the MCN communication system. For example, the alarm module 714 can identify when the agent of an MCN communication system has not communicated with the MCN communication system for a certain amount of time. The agent can provide updates relating to MCN communication system status, such as, whether battery power is running low, rebooting, going offline, or other computer management signals that could potentially affect network connectivity.

MCN Management Module

The MCN management module or MCN module 716 provides management and configuration for MCN systems 730. The MCN module 716 provides the user with remote access to the configuration of the MCN system. Each MCN system has specific configuration options. The configuration options can vary depending on whether the MCN system is a stand-alone unit, a master device or a secondary device. The configuration of secondary devices can be primarily handled through the master device.

The MCN module 716 allows a user to access statistics related to each MCN, such as the active subscribers connected to the MCN systems, registered UE/client devices, UL/DL statistics, alarms, and other MCN statistics.

Client (UE) Management Module

The client management module, or client module 718, provides management and configuration options for subscribers. The client module 718 can register new client (UE) devices to NOMs and specific MCN communication systems. A user can also manage existing UE subscribers that are on the network. The user can transfer UEs between MCN and between NOMs. The user can have access to all UE subscribed to all MCN on the account.

The user can manage and view UE traffic and manage connectivity and bandwidth of the devices. The user can block UE devices and remove them from the network. The client module 718 allows a user to access statistics related to each UE, such as UL/DL statistics, alarms, and other UE statistics.

Network Configuration Module

The network configuration module 720 manages and configures the network parameters. The NMCC can monitor multiple NOMs and MCN. After a NOM has been created, the NMCC can be used to monitor and configure the NOM. The network configuration module allows the user to configure manage the master and secondary devices within the network. The user can view network traffic activity and the total number of subscribers across the network. For example, as discussed above, FIG. 12 shows network statistics, such as connected users, RAN transmitted data, RAN received data, and Uplink transmitted data. In some embodiment the network configuration module can be used to add or remove a secondary MCN system from a NOM.

Figure 13:
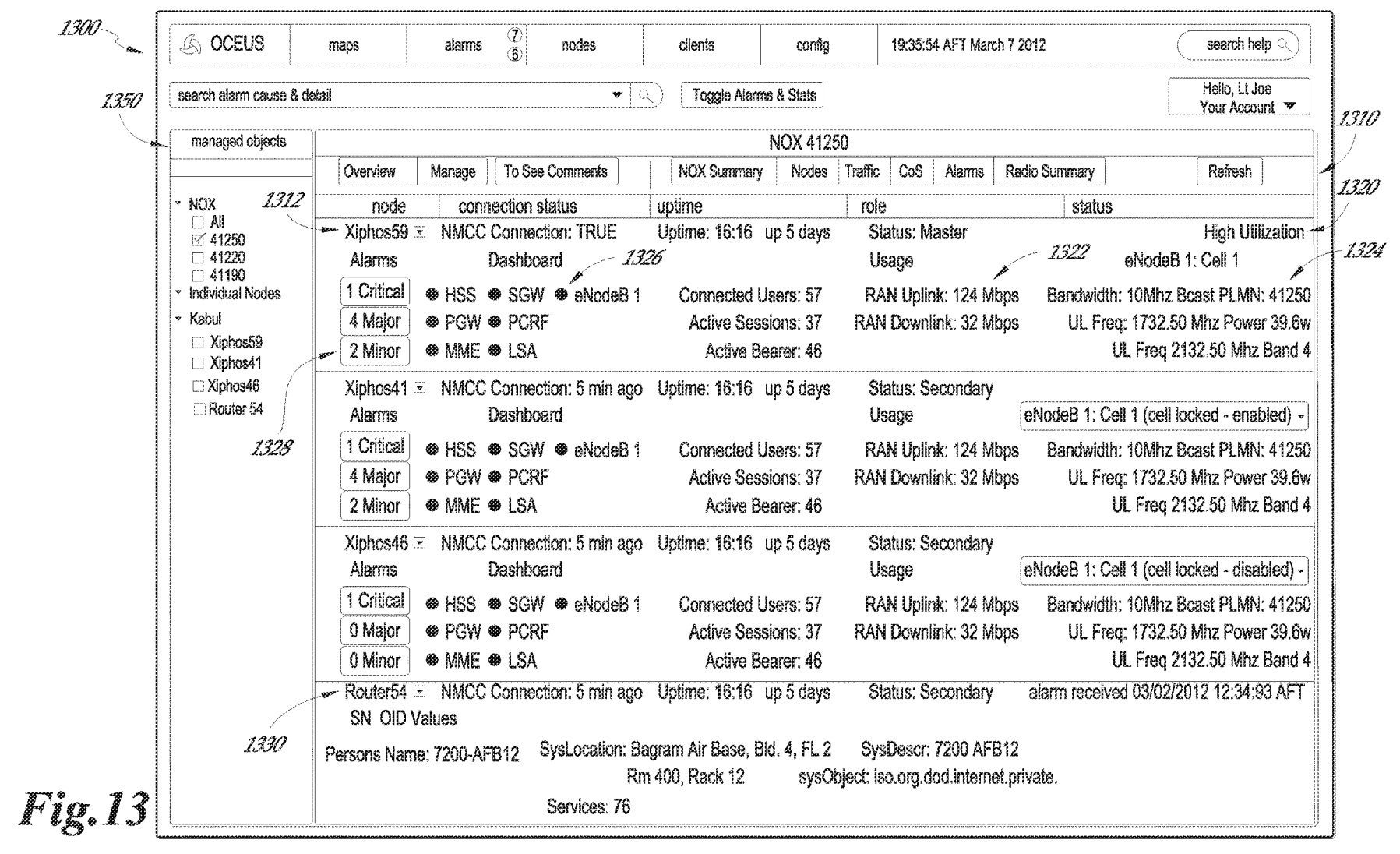

FIG. 13 illustrates an embodiment of a network configuration interface. The network configuration interface 1300 has a network device display 1310 and a sidebar 1350. The sidebar 1350 displays each of the NOMs and individual nodes associated with the account. When one or more of the NOMs or nodes is selected, the devices that are associated with the selection are displayed in the network device display 1310.

The display 1310 provides information about each device in a display box 1312, information can include the name, NMCC connection information, uptime and status information for each device. The NMCC connection information can also display if the connection was lost and the length of time between communications with the NMCC. The network device display 1310 can also display additional information for each device. The information can include usage information 1322, configuration information 1324, MCN device subsystem alarm data 1326, and other alarm information 1328. The usage information 1312 can include the number of connected subscribers or users, the number of active sessions, the number of active bearers, the uplink throughput, the downlink throughput, and the like. The configuration information 1324 can include the bandwidth, the uplink frequency, the downlink frequency, the band, power consumption, PLMN, and the like. The log file data can show the type of log files being generated by the device. The device can display additional configuration information, such as connections to one or more eNode B, or radio access components. The alarm information 1314 can include the alarm type, the number of alarms, and the like. The network device display can also display status messages 1320. The status messages can be based on alarms. The status display messages can be filtered based on priority. The network device display can also display information for other network devices 1330 that are part of a NOM such as routers, switches, SNMP capable device, and other network capable devices.

Figure 14:
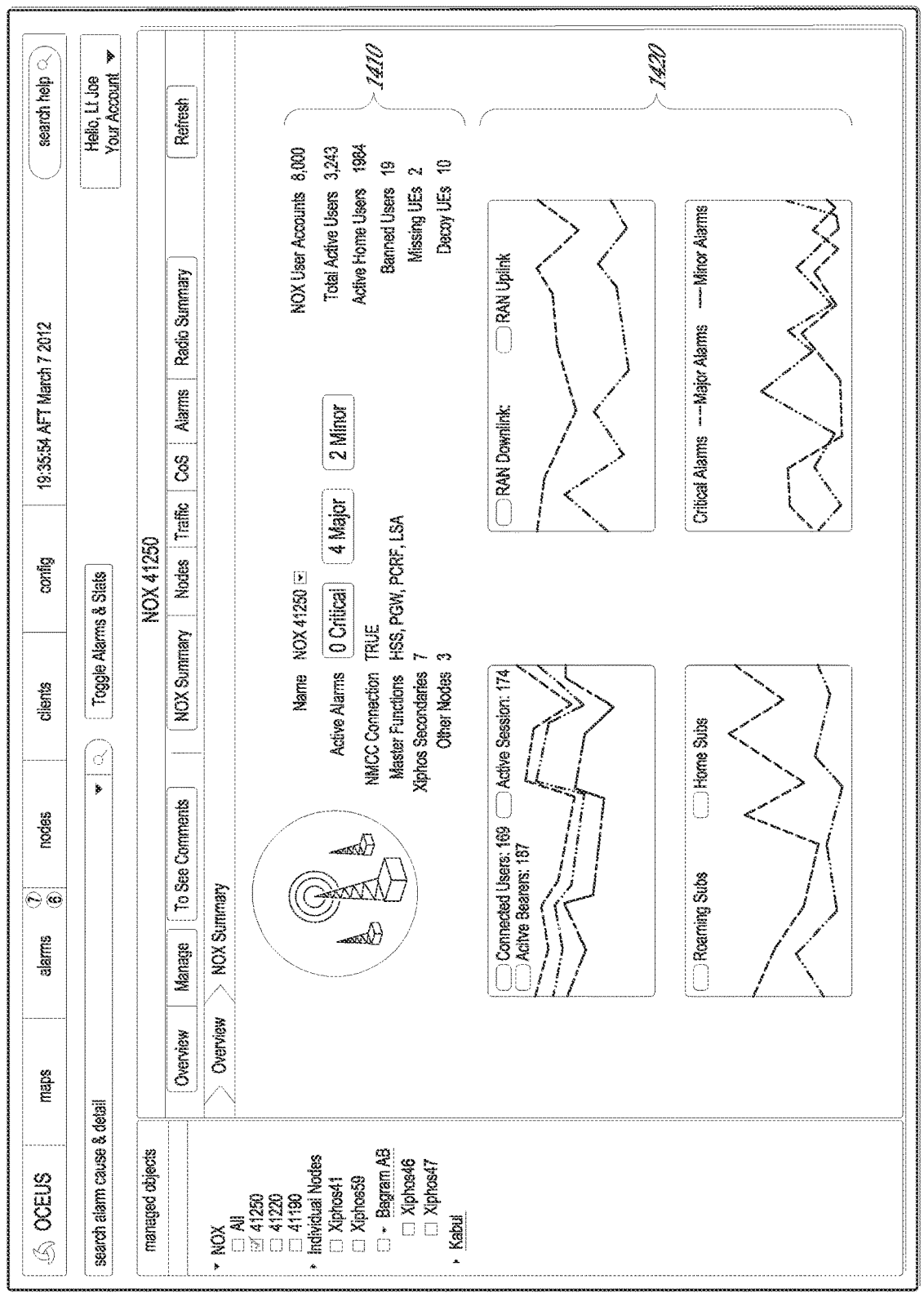
FIG. 14 is a flow diagram illustrative of an embodiment of a routine for aggregating and managing errors across multiple NOMs.

FIG. 14 illustrates a network summary interface 1400. The network summary interface 1400 can display information 1410 about all the information for a specific NOM or group of NOMs. The summary can aggregate the network information for the selected NOMs. The interface can also have a plurality of graphs or charts 1420 that display additional network information, such as subscriber information, alarm information and network information.

Figure 15:
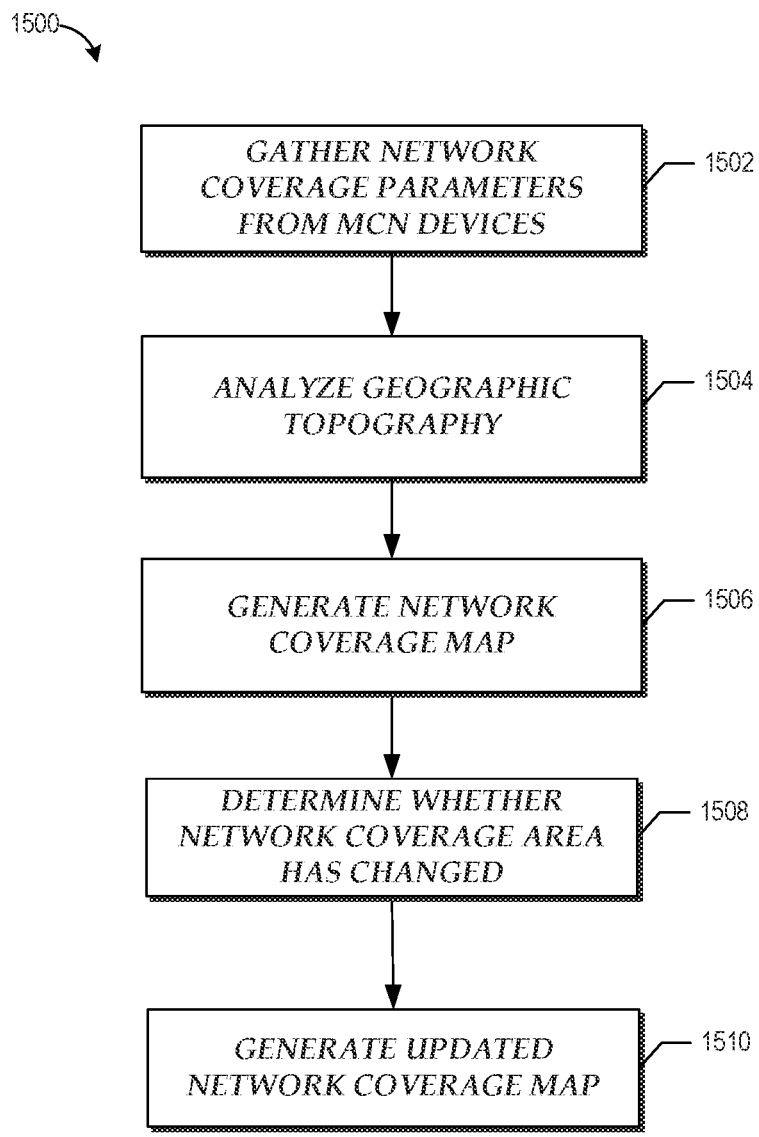
FIG. 15 is a flow diagram illustrative of an embodiment of a routine for creating and updating a network coverage map for a plurality of MCNs.

FIG. 15 is a flow diagram illustrative of one embodiment of a routine 1500 implemented by an NMCC system for creating and updating a network coverage map for a plurality of MCNs. One skilled in the relevant art will appreciate that the elements outlined for routine 1500 may be implemented by one or many computing devices/components that are associated with the NMCC system. Accordingly, routine 1500 has been logically associated as being generally performed by the NMCC system, and thus the following illustrative embodiments should not be construed as limiting.

At block 1502, the NMCC gathers network coverage parameters from a plurality of MCN communication systems. The network coverage parameters can include network information and positional information from each of the MCN communication systems. The network information can include information such as radio band, power, antenna configuration, and the like. The positional information can include information such as GPS location coordinates, velocity, acceleration, altitude, and the like. There can be stand-alone MCN, networked MCN (NOM), or combinations of each. An agent residing on each MCN communication system can communicate the information to the NMCC. In some embodiments, the master device in a NOM can communicate the network coverage parameters to the NMCC for each of the secondary devices within the NOM.

At block 1504, the NMCC gathers and analyzes the geographic topography of the terrain located around the MCN communication systems. The NMCC can gather the geographic data from a third party mapping service or other database service.

At block 1506, the NMCC generates a network coverage map for the plurality of MCN communication systems. The NMCC uses the network coverage parameters and the geographic data to generate the map. The mapping module 712 can generate the map. In some embodiments the data is generated using an RF mapping service. The generated coverage map can be display RF uplink coverage, RF downlink coverage, and other network coverage information, such as the signal strength of the coverage. The coverage map can be configured to have different overlays that show the different coverage types and the signal strength. The different overlays can have different colors or patterns to help users quickly interpret the coverage map.

At block 1508, the NMCC determines whether the network coverage area has changed since the creation of the network coverage map. The NMCC can use one or more thresholds to determine whether the coverage map has changed. Thresholds can be based on changes to the values of the network parameters for each MCN. Thresholds can also be based on the position of each MCN communication system. When the MCN communication systems change position, the MCN coverage area will move with the MCN communication system. The NMCC can determine when the sufficient thresholds have been satisfied that would indicate a change in the coverage area.

At block 1510, the NMCC generates an updated coverage map. The updated coverage map can be a full or partial update to the coverage map. In a full update the entire coverage map is regenerated. In a partial update, less than the entire coverage map is regenerated. The NMCC can determine based on the determination in block 908 whether to perform a full or a partial update to the coverage map.

Figure 16:
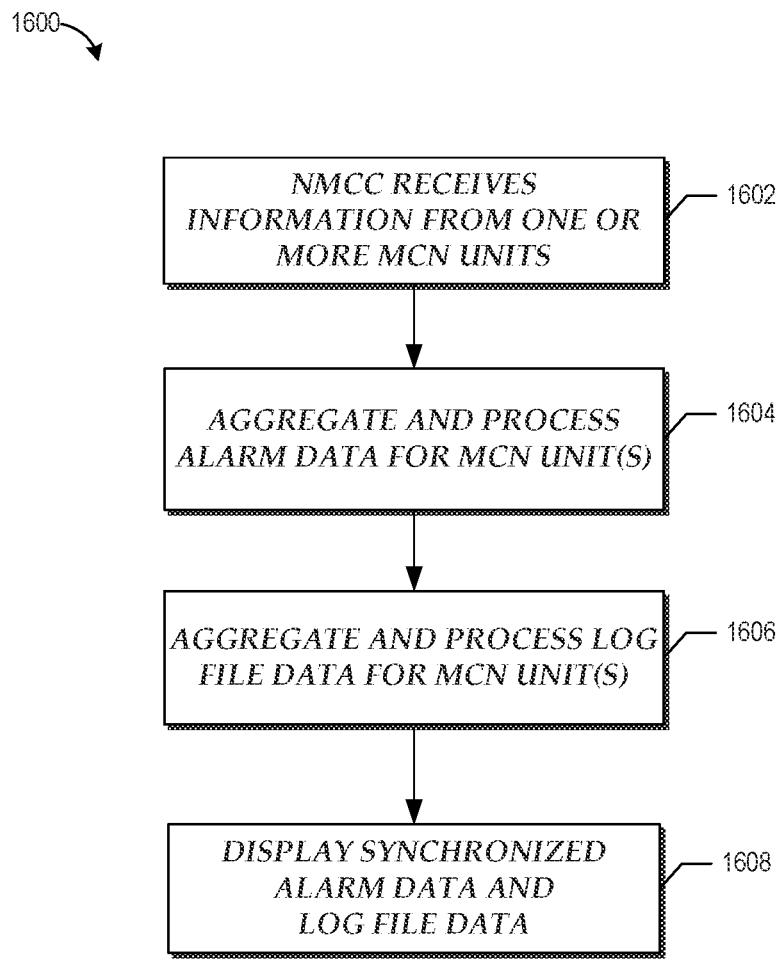
FIG. 16 is a flow diagram illustrative of an embodiment of a routine for aggregating and managing errors across multiple NOMs.

FIG. 16 is a flow diagram illustrative of one embodiment of a routine 1600 implemented by an NMCC system for aggregating and managing errors across multiple NOMs. One skilled in the relevant art will appreciate that the elements outlined for routine 1600 may be implemented by one or many computing devices/components that are associated with the NMCC system. Accordingly, routine 1600 has been logically associated as being generally performed by the NMCC system, and thus the following illustrative embodiments should not be construed as limiting.

At block 1602, the NMCC communicates with one or more MCN communication systems. The MCN communication systems can be part of a network of MCN communication systems (NOM). Each NOM can have a primary MCN communication system with one or more secondary MCN communication systems. There can also be standalone MCN communication systems that operate in isolation of other NOMs. There can be any number of NOMs that are setup and configured. Each NOM can be located in a different geographical location. Each MCN has an agent operating on the MCN communication systems that communicates with the NMCC over the network. The NMCC can be operating on a remote server. In some embodiments an MCN communication system can host the NMCC. The agents for each of the MCN communication system can communicate the network information to the NMCC. The network information can include alarm data and log files generated by the MCN communication system. In some embodiments, master devices will communicate network information to the NMCC for Secondary devices.

At block 1604, the NMCC aggregates and processes alarm data for each of the MCN communication systems configured at block 1402. The NMCC can use the data to monitor the health of the network and the individual MCN units. The NMCC can also generate alarms based on the data received from the MCN units.

At block 1606, the NMCC aggregates and processes log file data for each of the MCN communication systems configured at block 1402. The NMCC indexes the log file data according by MCN, log file data type, time, and other parameters. The NMCC can process the log data in real time as it is received from the MCN communication systems.

At block 1608, the NMCC can display synchronized alarm data and the log file data to a user. The NMCC can correlate each log file with alarms that are generated at the NMCC. The user can filter the log and alarm data so that only the relevant log data associated with each alarm is displayed by selecting the appropriate filters. The log file data can be filtered to only display log data that preceded the alarm. Additionally, log data from multiple log files can be displayed to the user.

The term Xiphos is used in the drawings illustratively. Xiphos refers to an MCN communication system, and any reference to Xiphos is not limiting or referring to a specific product line or implementation of a Xiphos product.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples.

What is claimed is:

1. A computing system, comprising:
one or more processors configured to:
establish communication with a first mobile cellular network (MCN) communication system, wherein the first MCN communication system provides a first cellular network to a plurality of first user equipment located in a first coverage area;
establish communication with a second mobile cellular network (MCN) communication system, wherein the second MCN communication system provides a second cellular network to a plurality of second user equipment located in a second coverage area;
receive a first error log from the first MCN communication system indicating a first error;
receive a second error log from the second MCN communication system indicating a second error;
aggregate the first error log with the second error log to form an aggregated error log; and
cause display of the aggregated error log.

2. The computing system of claim 1, wherein the one or more processors are further configured to receive and manage alarm data from the one or more MCN communication systems.

3. The computing system of claim 1, wherein the one or more processors are further configured to:
cause display of a user interface; and
cause display, within the user interface, of an alarm in response to the aggregated error log.

4. The computing system of claim 1, wherein the one or more processors are further configured to filter the first error log based on the second error log.

5. The computing system of claim 1, wherein the one or more processors are further configured to filter the first error log based on a time window.

6. The computing system of claim 1, wherein the one or more processors are further configured to:
determine a location of the first coverage area, and cause display of the determined location of the first coverage area.

7. The computing system of claim 6, wherein the one or more processors are further configured to:
determine a location of the second coverage area, and cause display of the determined location of the second coverage area relative to the first coverage area.

8. A non-transitory computer-readable medium comprising computer executable instructions that, when executed by one or more processors, causes the one or more processors to:
- establish communication with a first mobile cellular network (MCN) communication system, wherein the first MCN communication system provides a first cellular network to a plurality of first user equipment located in a first coverage area;
- establish communication with a second mobile cellular network (MCN) communication system, wherein the second MCN communication system provides a second cellular network to a plurality of second user equipment located in a second coverage area;
- aggregate a first error log with a second error log based on receiving the first error log from the first MCN communication system indicating a first error, and receiving the second error log from the second MCN communication system indicating a second error, to form an aggregated error log; and
- cause display of the aggregated error log.

9. The non-transitory computer-readable medium of claim 8, wherein the computer executable instructions further cause the one or more processors to:
- manage alarm data from the first MCN communication systems and the second MCN communication systems.

10. The non-transitory computer-readable medium of claim 8, wherein the computer executable instructions further cause the one or more processors to:
- cause display of a user interface; and
- cause display, within the user interface, of an alarm in response to the aggregated error log.

11. The non-transitory computer-readable medium of claim 8, wherein the computer executable instructions further cause the one or more processors to:
- filter the first error log based on the second error log.

12. The non-transitory computer-readable medium of claim 8, wherein the computer executable instructions further cause the one or more processors to:
- filter the first error log based on a time window.

13. The non-transitory computer-readable medium of claim 8, wherein the computer executable instructions further cause the one or more processors to:
- determine a location of the first coverage area, and
- cause display of the determined location of the first coverage area.

14. The non-transitory computer-readable medium of claim 13, wherein the computer executable instructions further cause the one or more processors to:
- determine a location of the second coverage area, and
- cause display of the determined location of the second coverage area relative to the first coverage area.

15. A method for generating an aggregated error log for one or more mobile cellular networks (MCN) communication system, the method comprising:
- establishing communication with a first mobile cellular network (MCN) communication system, wherein the first MCN communication system provides a first cellular a first cellular network to a plurality of first user equipment located in a first coverage area;
- establishing communication with a second mobile cellular network (MCN) communication system, wherein the second MCN communication system provides a second cellular network to a plurality of second user equipment located in a second coverage area;
- aggregating a first error log with a second error log based on receiving the first error log from the first MCN communication system indicating a first error;
- receiving the second error log from the second MCN communication system indicating a second error, to form an aggregated error log; and
- causing display of the aggregated error log.

16. The method of claim 15, wherein causing display of the aggregated error log comprises causing display of the aggregated error log based on a filter.

17. The method of claim 15, wherein causing display of the aggregated error log comprises causing display of the aggregated error log on a graphical user interface.

18. The method of claim 15, further comprising:
- determining a location of the second coverage area, and
- causing display of the determined location of the second coverage area relative to the first coverage area.

19. The method of claim 15, wherein the first error log is displayed based on a filtering of a time window.

\* \* \* \* \*